(12) United States Patent
Nagao et al.

(10) Patent No.: US 10,290,162 B2
(45) Date of Patent: May 14, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Yoshitaka Nagao, Tokyo (JP); Kanako Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/688,067

(22) Filed: Aug. 28, 2017

(65) Prior Publication Data

US 2018/0061161 A1 Mar. 1, 2018

(30) Foreign Application Priority Data

Aug. 30, 2016 (JP) ................................ 2016-168355

(51) Int. Cl.
*G08B 19/00* (2006.01)
*G07C 9/00* (2006.01)
*G06M 3/08* (2006.01)
*G06Q 10/04* (2012.01)
*G07C 11/00* (2006.01)

(52) U.S. Cl.
CPC .......... *G07C 9/00166* (2013.01); *G06M 3/08* (2013.01); *G06Q 10/04* (2013.01); *G07C 11/00* (2013.01); *G07C 2011/04* (2013.01)

(58) Field of Classification Search
CPC .................................................. G07C 9/00166
USPC .... 340/517, 521, 540, 541, 10.5; 705/2, 402
See application file for complete search history.

(56) References Cited

U.S. PATENT DOCUMENTS

| | | | |
|---|---|---|---|
| 2008/0046385 A1* | 2/2008 | Dube | G06Q 30/02 705/402 |
| 2009/0063205 A1* | 3/2009 | Shibasaki | G06Q 10/02 705/5 |
| 2017/0083831 A1* | 3/2017 | Ghosh | G06Q 10/02 |
| 2017/0277959 A1* | 9/2017 | Winter | G06K 9/00778 |

FOREIGN PATENT DOCUMENTS

| | | |
|---|---|---|
| JP | 3826956 B2 | 9/2006 |
| JP | 2014-215917 A | 11/2014 |

* cited by examiner

*Primary Examiner* — Tai T Nguyen
(74) *Attorney, Agent, or Firm* — Canon U.S.A., Inc. IP Division

(57) ABSTRACT

An information processing apparatus includes an acquisition unit that acquires a number of objects lining up in a queue when a target object targeted for measuring a queuing time enters the queue, a first detection unit that detects an object exiting the queue, and a measurement unit that measures, as a queuing time of the target object in the queue, a period from a time when the target object enters the queue to a time when a number of objects corresponding to the number acquired by the acquisition unit are detected by the first detection unit after the target object enters the queue.

18 Claims, 14 Drawing Sheets

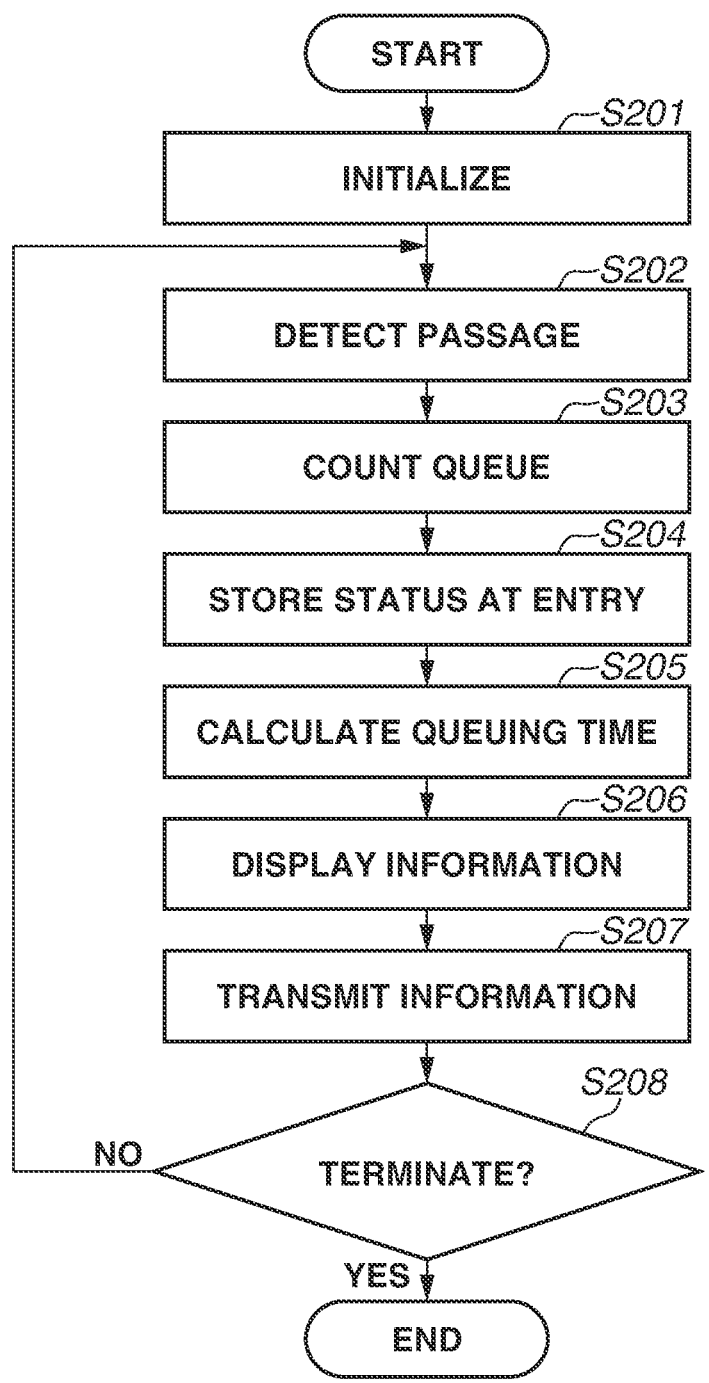

FIG.4A

| ENTRY DETECTION TIME T1 (HH:MM:SS) | NUMBER OF PERSONS IN QUEUE (PERSONS) |
|---|---|
| 11:01:15 | 9 | ← ARRIVAL OF PERSON A
| 11:01:28 | 10 |
| 11:02:19 | 10 |
| 11:02:25 | 9 |
| 11:03:11 | 7 |
| ... | ... |

FIG.4B

| EXIT DETECTION TIME T2 (HH:MM:SS) | WAITING ORDER OF PERSON A |
|---|---|
| 11:01:10 | |
| 11:01:35 | 8 |
| 11:02:21 | 7 |
| 11:02:30 | 6 |
| 11:03:01 | 5 |
| 11:03:15 | 4 |
| 11:03:45 | 3 |
| 11:04:40 | 2 |
| 11:05:30 | 1 |
| 11:06:20 | 0 |
| ... | |

FIG.7

| ENTRY DETECTION TIME T1 (HH:MM:SS) | NUMBER OF PERSONS IN QUEUE (PERSONS) |
|---|---|
| 11:01:15 | 9 |
| 11:01:28 | 10 |
| 11:02:19 | 10 |
| 11:02:25 | 9 |
| 11:03:11 | 7 |
| ... | ... |

WAITING ORDER OF PERSON A AT TIME OF ARRIVAL W = 9

| EXIT DETECTION TIME T2 (HH:MM:SS) |
|---|
| 11:01:10 |
| 11:01:35 |
| 11:02:21 |
| 11:02:30 |
| 11:03:01 |
| 11:03:15 |
| 11:03:45 |
| 11:04:40 |
| 11:05:30 |
| 11:06:20 |
| ... |

TOTAL NUMBER OF RECORDS R = 9

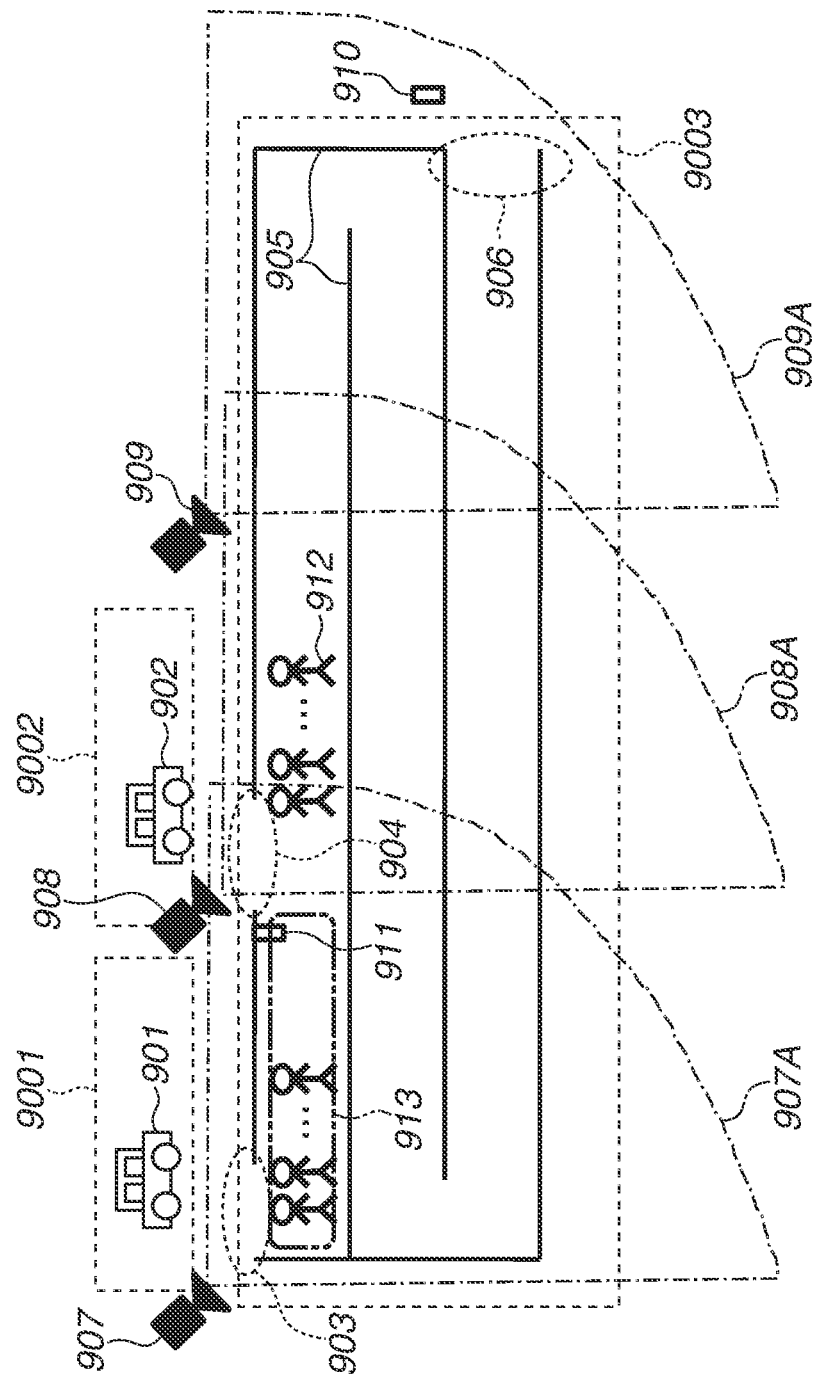

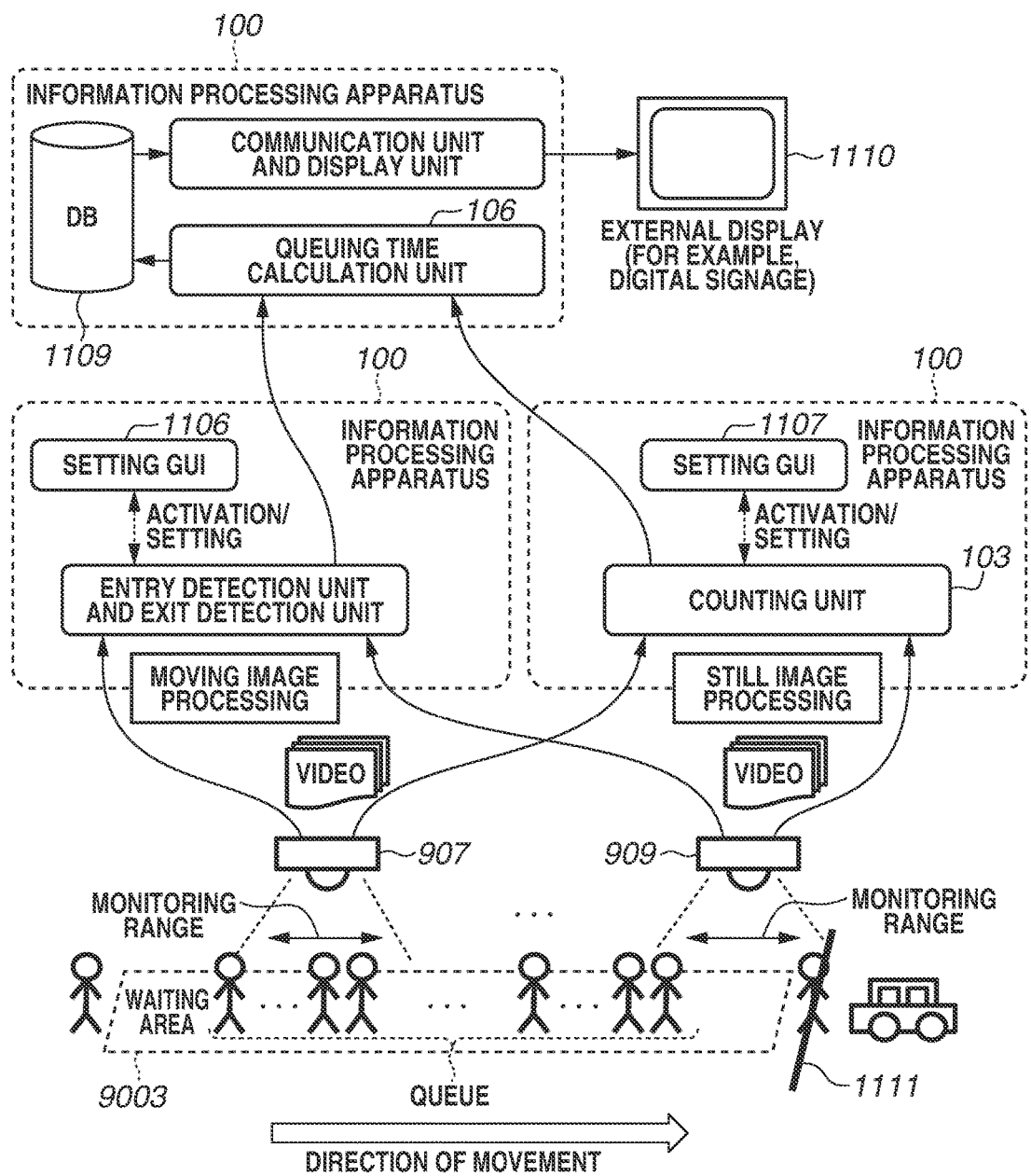

INFORMATION PROCESSING APPARATUS, INFORMATION PROCESSING METHOD, AND STORAGE MEDIUM

BACKGROUND

Field

Aspects of the present disclosure generally relate to an information processing apparatus, an information processing method, and a storage medium.

Description of the Related Art

With respect to a queue, such as a queue including persons waiting to get a taxi, where the service time is not constant, there is a need to know a queuing time of each object or its statistics in the queue.

A conventional system calculates a queuing time based on an average service time, e.g., how fast a line is moving and the number of objects in a queue. Another conventional system issues a numbered ticket when an object enters a queue and calculates an actual queuing time based on a booking time (the time when the object enters the queue) and guiding time (the time when the object exits the queue).

For example, Japanese Patent No. 3,826,956 discusses a queuing time management system that measures an actual performance queuing time based on inputting of waiting start information and waiting end information in a queue via an input unit in, for example, restaurants, play facilities, or banks.

Japanese Patent Application Laid-Open No. 2014-215917 discusses a queue estimation system that provides, at every specified time, an average queuing time and the length of a queue required for using an external terminal based on logs of a service provided by the external terminal without separately acquiring the time when a customer stands at the end of the queue.

The conventional technique discussed in Japanese Patent No. 3,826,956 can be used to acquire an individual actual performance queuing time. The conventional technique discussed in Japanese Patent Application Laid-Open No. 2014-215917 can be used to calculate an average queuing time based on logs of a service.

However, Japanese Patent No. 3,826,956 and Japanese Patent Application Laid-Open No. 2014-215917 presume that, for example, when an object enters a queue, a customer or staff operates a terminal of the system to record its time.

In the conventional techniques discussed in Japanese Patent No. 3,826,956 and Japanese Patent Application Laid-Open No. 2014-215917, in the case of, for example, a queue for getting a taxi, an input operation on an input device can be troublesome. A queuing time can be calculated by acquiring an image at the entrance of a queue area, such as an admission gate or a riding entrance, recognizing an object by, for example, face authentication, and identifying the object. However, since it is necessary to acquire an image of an object with relatively great accuracy, recognition can fail depending on the orientation of the object. As a result, for example, a queuing time of the object in a queue may not be able to be measured. While it can be considered to detect and track an object using image processing, in the case of performing tracking in a seamless manner or using a plurality of cameras for a wide area, there is an issue with the accuracy of tracking, so that a queuing time can sometimes be unmeasurable.

SUMMARY

According to an aspect of the present disclosure, an information processing apparatus includes an acquisition unit configured to acquire a number of objects lining up in a queue when a target object targeted for measuring a queuing time enters the queue, a first detection unit configured to detect an object exiting the queue, and a measurement unit configured to measure, as a queuing time of the target object in the queue, a period from a time when the target object enters the queue to a time when a number of objects corresponding to the number acquired by the acquisition unit are detected by the first detection unit after the target object enters the queue.

Further features will become apparent from the following description of exemplary embodiments with reference to the attached drawings.

BRIEF DESCRIPTION OF THE DRAWINGS

FIG. 2 is a flowchart illustrating an example of processing performed by the information processing apparatus.

FIGS. 4A and 4B illustrate an example of a method for calculating a queuing time.

FIG. 7 illustrates an example of a method for calculating a queuing time.

FIG. 9 illustrates an example of the application of a queuing time measurement system.

FIG. 11 illustrates an example of a system configuration of the queuing time measurement system and other devices.

DESCRIPTION OF THE EMBODIMENTS

Various exemplary embodiments will be described in detail below with reference to the drawings.

In a first exemplary embodiment, processing performed by a queuing time measurement system to measure a queuing time in a queue is described. While, in the first exemplary embodiment, objects lining up in a queue are assumed to be human bodies, they can be, for example, animals such as farm animals, industrial products or interim products that are being conveyed via lanes in a factory, cargos or containers that are being conveyed via transportation lanes.

The queuing time measurement system includes an information processing apparatus 100. The information processing apparatus 100 is an information processing apparatus that measures a queuing time in a queue. The information processing apparatus 100 is configured with, for example, a personal computer (PC), a server apparatus, or a tablet apparatus.

Figure 1A:
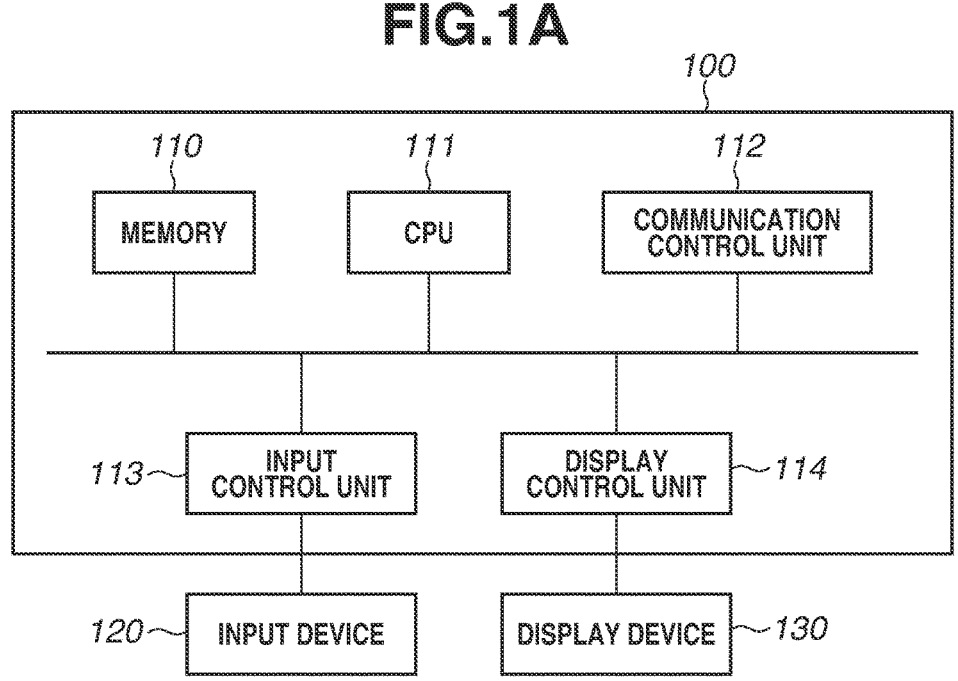
FIGS. 1A and 1B respectively illustrate an example of a hardware configuration and an example of a functional configuration of an information processing apparatus and other devices or units.

FIG. 1A illustrates an example of a hardware configuration of the information processing apparatus 100 and other devices according to the first exemplary embodiment.

The information processing apparatus 100 includes a memory 110, a central processing unit (CPU) 111, a communication control unit 112, an input control unit 113, and a display control unit 114.

The memory 110 is a storage device that stores, for example, various programs, various pieces of setting data, various pieces of threshold data, and image data representing captured images of a queue. The CPU 111 is a processor that controls processing performed by the information processing apparatus 100. The communication control unit 112 is a communication controller used to communicate with an external apparatus via a network. The input control unit 113 is an input controller that controls inputting of information to the information processing apparatus 100 via an input device 120. The display control unit 114 is a display controller that controls displaying of a screen on a display device 130. While, in the first exemplary embodiment, the information processing apparatus 100 and the display device 130 are assumed to be separate devices, the display device 130 can and the information processing apparatus 100 can be integrated into single entity. The queuing time measurement system can include a plurality of display devices as the display device 130.

For example, functions of the information processing apparatus 100 described below with reference to FIG. 1B and processing performed in a flowchart described below with reference to FIG. 2 are implemented by the CPU 111 executing processing based on a program stored in, for example, the memory 110.

Figure 1B:
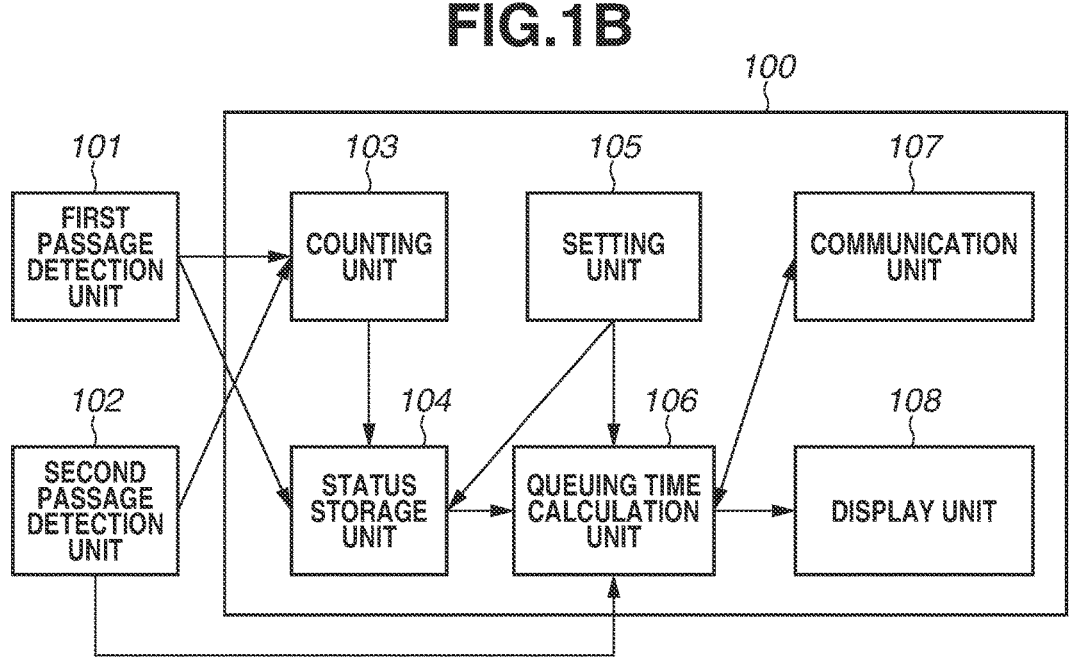

FIG. 1B illustrates an example of a functional configuration of the information processing apparatus 100 and other units according to the first exemplary embodiment.

The information processing apparatus 100 includes a counting unit 103, a status storage unit 104, a setting unit 105, a queuing time calculation unit 106, a communication unit 107, and a display unit 108.

A first passage detection unit 101 and a second passage detection unit 102 detect passage of an object included in a queue. Each of the first passage detection unit 101 and the second passage detection unit 102 is configured with, for example, a passage sensor using, for example, infrared light or a camera including an image analysis function of detecting passage of an object. The first passage detection unit 101 is provided at an entrance of the queue and detects an object entering the queue. The second passage detection unit 102 is provided at an exit of the queue and detects an object exiting the queue. While, in the first exemplary embodiment, the first passage detection unit 101 and the second passage detection unit 102 are configured to detect persons passing through the entrance and exit of the queue on a person-by-person basis, they can be configured to detect a plurality of persons at a time.

A partial queue that is clipped out of a certain queue can also be deemed to be a single queue. For example, the queuing time measurement system can also deem a line from just the middle position to the exit in a queue standing in a row to be a single queue and measure a queuing time from the middle position to the exit.

In the first exemplary embodiment, the first passage detection unit 101 and the second passage detection unit 102 respectively detect an object entering a queue and an object exiting a queue and then transmit information indicating that the objects have been detected to the counting unit 103 and the status storage unit 104. However, the queuing time measurement system can be configured not to include the first passage detection unit 101 and the second passage detection unit 102 but to include an imaging apparatus, such as a camera, which captures images of the entrance and exit of a queue. In that case, the CPU 111 is configured to detect an object entering a queue and an object exiting a queue based on the images of the entrance and exit of the queue captured by the imaging apparatus. Furthermore, each of the first passage detection unit 101 and the second passage detection unit 102 is able to change an object to be detected, for example, according to an instruction from the information processing apparatus 100 which is based on an operation performed by the user via the input device 120.

The counting unit 103 acquires the number of objects present in a queue based on a result of detection of the passage of objects through the entrance and exit of the queue performed by the first passage detection unit 101 and the second passage detection unit 102.

When an object passing through the entrance of the queue has been detected by the first passage detection unit 101, the status storage unit 104 stores information indicating a set of the time of detection of the object and the number of objects acquired by the counting unit 103 in, for example, the memory 110. The stored time serves as the measurement start time of a queuing time of the associated object. Moreover, the stored number of objects serves as a waiting order in a queue of an object entering the queue at the time of detection (the number of objects in the queue). Each time an object passing through the entrance of a queue is detected by the first passage detection unit 101, the status storage unit 104 stores information indicating a set of the time of detection of the object and the number of objects acquired by the counting unit 103. However, the status storage unit 104 can be configured to store information indicating a set of the time detected by the first passage detection unit 101 and the number of objects counted by the counting unit 103 with respect to the latest object entering a queue for each set unit time. Moreover, the status storage unit 104 can be configured to delete data which has become unnecessary for queuing time measurement from, for example, the memory 110.

The setting unit 105 receives designation of timing of measurement or displaying of the number of waiting persons or the queuing time at the time when the queuing time measurement system is activated, based on an operation performed by the user via the input device 120. Moreover, the setting unit 105 determines information indicated by the received designation as setting information which is information used for queuing time acquisition processing. The setting unit 105 can store the acquired information in, for example, the memory 110. In a case where the setting information previously stored is present in the memory 110, the setting unit 105 can use the stored setting information without receiving designation from the user. This eliminates the need for the user to perform an input operation each time the queuing time measurement system is activated, so that the queuing time measurement system can improve user convenience.

Each time an object exiting a queue is detected by the second passage detection unit 102, the queuing time calculation unit 106 decrements the number of objects corresponding to the information indicating a set stored by the status storage unit 104 in, for example, the memory 110 as much as the number of detected objects. The queuing time calculation unit 106 performs this processing to move up the waiting order in a queue of an object entering the queue at a certain time.

The queuing time calculation unit 106 sequentially performs this processing each time an object is detected by the second passage detection unit 102. Then, the queuing time calculation unit 106 determines the time when the number of objects corresponding to the information indicating a set stored in, for example, the memory 110 by the status storage unit 104 has become 0 or less as the measurement end time of a queuing time when an object exits the queue. Then, the queuing time calculation unit 106 calculates a difference between the measurement end time and the measurement start time corresponding to the information indicating a set stored by the status storage unit 104 as an actual queuing time.

The communication unit 107 transmits information about the queuing time calculated by the queuing time calculation unit 106 to an external apparatus such as a terminal device. The communication unit 107 performs wired or wireless communications with an external apparatus such as a terminal device.

The display unit 108 displays, on the display device 130, information (for example, a character string or a numerical sequence) indicating the queuing time calculated by the queuing time calculation unit 106 at timing indicated by the setting information determined by the setting unit 105.

In the first exemplary embodiment, each of the functional constituent elements 103 to 108 is assumed to be a functional constituent element included in the information processing apparatus 100, which is a single apparatus. However, in a system having a plurality of information processing apparatuses interconnected, the plurality of information processing apparatuses can include the respective functional constituent elements 103 to 108 in a distributed manner. Moreover, each of the functional constituent elements 103 to 108 can be configured as hardware included in the information processing apparatus 100.

FIG. 2 is a flowchart illustrating an example of processing performed by the information processing apparatus 100 according to the first exemplary embodiment.

The processing illustrated in FIG. 2 is started at the time when the queuing time measurement system is activated.

In step S201, the setting unit 105 acquires setting information which is used for queuing time measurement processing, based on an operation performed by the user via the input device 120 or by acquiring setting information stored in the memory 110. The counting unit 103 initializes the number of objects in a queue with the number of objects in a queue obtained at the time when the queuing time measurement system is activated, which is indicated by the acquired setting information.

In step S202, the first passage detection unit 101 and the second passage detection unit 102 detect passage of the respective objects based on signals output from the respective passage sensors included in the first passage detection unit 101 and the second passage detection unit 102. The first passage detection unit 101 is located in the vicinity of the entrance of a queue and detects an object entering the queue. The second passage detection unit 102 is located in the vicinity of the exit of a queue and detects an object exiting the queue.

In step S203, the counting unit 103 acquires the number of objects present in the queue based on results of detection by the first passage detection unit 101 and the second passage detection unit 102.

In step S204, when an object has been detected by the first passage detection unit 101, the status storage unit 104 acquires the number of objects present in the queue acquired by the counting unit 103 when the object has been detected by the first passage detection unit 101. Then, the status storage unit 104 stores information indicating a set of the time when the object has been detected by the first passage detection unit 101 and the acquired number of objects in, for example, the memory 110.

In step S205, the queuing time calculation unit 106 calculates a queuing time of an object in the queue according to the setting information acquired in step S201. Each time an object is detected by the second passage detection unit 102, the queuing time calculation unit 106 subtracts the number of detected objects from the number of objects corresponding to the information indicating a set stored in step S204. When the result of subtraction has become 0 or less, the queuing time calculation unit 106 calculates a difference between the time when an object has been detected by the second passage detection unit 102 at that time and the time when the object has been detected by the first passage detection unit 101 as a queuing time of the object. The queuing time calculation unit 106 can process the queuing time calculated as described above into a required display format, such as data used at the time of start of measurement or at the time of end of measurement, a histogram in a given time period, or an average value or moving average value at each time.

In step S206, the display unit 108 displays information indicating the queuing time calculated in step S205 on the display device 130. Furthermore, the display unit 108 can display information about, for example, a previous queuing time or the frequency of passage of objects at the entrance or exit in a queue on the display device 130.

In step S207, the communication unit 107 determines whether to transmit information about the queuing time calculated in step S205 to an external terminal device, for example, based on setting information stored in the memory 110 or a request from the external terminal device. Then, when determining to transmit information about the queuing time calculated in step S205 to an external terminal device, the communication unit 107 transmits the information about the queuing time calculated in step S205 to the external terminal device.

In step S208, the queuing time calculation unit 106 determines whether an instruction for terminating acquisition processing for the queuing time in a queue has been received based on, for example, an operation performed by the user via the input device 120. If the queuing time calculation unit 106 determines that an instruction for terminating acquisition processing for the queuing time in a queue has been received based on, for example, an operation performed by the user via the input device 120 (YES in step S208), the processing illustrated in FIG. 2 ends. If the queuing time calculation unit 106 determines that an instruction for terminating acquisition processing for the queuing time in a queue is not received based on, for example, an operation performed by the user via the input device 120 (NO in step S208), the processing returns to step S202.

In the description of FIG. 2, steps S203, S204, S206, and S207 have been described as a series of processing operations. However, the counting unit 103 and the queuing time calculation unit 106 can be configured to write, for example, results of calculation in steps S203, S204, and S205 in, for example, a database or file stored in the memory 110. Then, the queuing time calculation unit 106, the display unit 108, and the communication unit 107 can perform processing for reading contents of, for example, a database or file stored in the memory 110 as processing different from the processing in steps S203 to S205 and in parallel with the processing in steps S203 to S205. The queuing time measurement system and an external terminal device can be interconnected via a network, the external terminal device can request the communication unit 107 to transmit, for example, data about the queuing time, and data transmitted from the communication unit 107 in response to the request can be displayed on, for example, a display device of the terminal device.

Next, an example of an operation of the queuing time measurement system when the processing illustrated in the flowchart of FIG. 2 is performed is described. In an example illustrated in FIGS. 3A and 3B, each of the first passage detection unit 101 and the second passage detection unit 102 is configured with an infrared sensor.

Figure 3A:
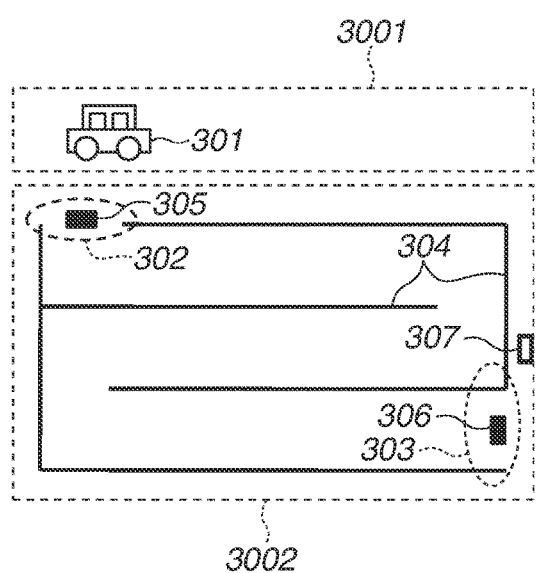
FIGS. 3A and 3B illustrate an example of the application of a queuing time measurement system.
Figure 3B:
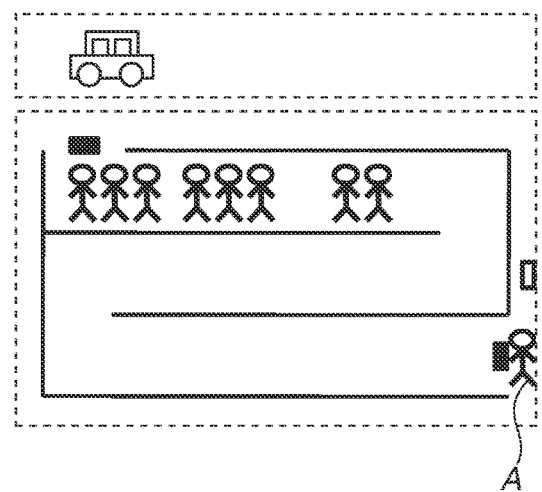

FIGS. 3A and 3B illustrate an example of the application of the queuing time measurement system. An example in which processing performed by the queuing time measurement system is applied to a queue at a taxi stand is described with reference to FIGS. 3A and 3B.

FIG. 3A illustrates a taxi 301 arriving at a taxi stand within a range indicated by a region 3001. A region 3002 is a region in which persons who want to take a taxi line up. In the example illustrated in FIGS. 3A and 3B, a line including all of the persons present in the region 3002 is assumed to be a queue.

Within a range of the region 3002, there is an exit 302, which is a place where to get a taxi, and an entrance 303, which is a place where to enter the region 3002. Guide poles 304 are guide poles that define the region 3002 and prompt lining-up of a queue. Instead of the guide poles 304, for example, a line that clearly indicates a portion where to enter the region 3002 or the route of a queue can be drawn on the floor.

An infrared sensor 305, which serves as the second passage detection unit 102, is placed above the exit 302. Moreover, an infrared sensor 306, which serves as the first passage detection unit 101, is placed above the entrance 303. Furthermore, a display monitor 307 for displaying the calculated queuing time, which serves as the display device 130, is placed in the vicinity of the entrance 303.

The example illustrated in FIG. 3A indicates a state in which any queue has not yet occurred, and no person is present in the region 3002.

In the state illustrated in FIG. 3A, since a queue for taxis is not yet formed, the number of waiting persons in counting for a queue in step S203 of the processing flow described with reference to the flowchart of FIG. 2 is 0.

FIG. 3B illustrates an example of the situation in which a person A who intends to take a taxi is passing under the first passage detection unit 101 to enter the region 3002. In the example illustrated in FIG. 3B, the queuing time measurement system measures a queuing time of the person A. The person A is an example of a target object which is an object targeted for queuing time measurement processing performed by the queuing time measurement system.

FIGS. 4A and 4B illustrate an example of a method of calculating a queuing time. FIG. 4A illustrates an example of, for example, information stored in, for example, the memory 110 by the status storage unit 104 when the person A has entered the region 3002 in the state illustrated in FIG. 3B and has entered the queue. In a table illustrated in FIG. 4A, a row indicated by "ARRIVAL OF PERSON A" includes information of "11:01:15" (one minute and fifteen seconds past eleven), which is the time when the first passage detection unit 101 detected the person A (the measurement start time of a queuing time of the person A). Moreover, the row indicated by "ARRIVAL OF PERSON A" in the table illustrated in FIG. 4A includes information of "9", which is the number of persons in the queue counted by the counting unit 103 when the person A got in the queue (the waiting order of the person A in the queue).

Each of the other rows in the table illustrated in FIG. 4A indicates, with respect to a person who got in the queue prior to the person A, the time when the first passage detection unit 101 detected the person and the number of persons in the queue counted by the counting unit 103 when the person got in the queue. For example, a row just below the row indicated by "ARRIVAL OF PERSON A" indicates that a certain person got in the queue at one minute and twenty-eight seconds past eleven and ten persons including the certain person were present in the queue when the certain person got in the queue.

FIG. 4B illustrates an example of a table indicating the time when a person passing through the exit of the queue (a person exiting the queue) was detected by the second passage detection unit 102.

The queuing time calculation unit 106 performs the following processing each time the second passage detection unit 102 detects a person exiting the queue after the time when the first passage detection unit 101 detected the person A. In other words, the queuing time calculation unit 106 subtracts the number of persons detected by the second passage detection unit 102 one by one from the number of persons in the queue present when the person A got in the queue stored in the status storage unit 104.

The table illustrated in FIG. 4A stored by the status storage unit 104 can further include, besides the entry detection time and the number of persons in a queue, an item of "waiting order". Then, in a case where a person is detected by the first passage detection unit 101, when adding a new row to the table illustrated in FIG. 4A, the status storage unit 104 enters the same value as that of the item of the number of persons in a queue into an item of the waiting order. Each time a person is detected by the second passage detection unit 102, the queuing time calculation unit 106 subtracts the number of persons detected by the second passage detection unit 102 from the number of the waiting order in the table illustrated in FIG. 4A. Then, when the value of the waiting order of the person A has become 0 or less, the queuing time calculation unit 106 determines that the person A has exited the queue. Numerals at the side of the table illustrated in FIG. 4B indicate the values of the waiting order of the person A. The example illustrated in FIG. 4B indicates that, each time a person exiting the queue is detected by the second passage detection unit 102, the value is decremented by one. In the example illustrated in FIG. 4B, it is revealed that the person A got out of the queue at six minutes and twenty seconds past eleven, when the value of the waiting order became 0.

Accordingly, the queuing time calculation unit 106 calculates the queuing time of the person A as "six minutes and twenty seconds past eleven"–"one minute and fifteen seconds past eleven"="five minutes and five seconds".

In the description of the first exemplary embodiment, information about the waiting order of a person in a queue is stored by the status storage unit 104 in the table illustrated in FIG. 4A. However, the status storage unit 104 can be configured to store information about the waiting order of a person entering a queue in, for example, the memory 110 as information separate from the table illustrated in FIG. 4A. In that case, the queuing time calculation unit 106 decrements the value stored in the information about the waiting order stored as information separate from the table illustrated in FIG. 4A each time a person is detected by the second passage detection unit 102.

In a case where it is unnecessary to preserve information about the number of persons in a queue when a person enters the queue, the status storage unit 104 can be configured not to store information about the waiting order of a person in the queue. In that case, the queuing time calculation unit 106 decrements the value stored in the item of the number of persons in a queue in the table illustrated in FIG. 4A each time a person is detected by the second passage detection unit 102. Then, the queuing time calculation unit 106 determines that the time when the second passage detection unit 102 has detected a person in a case where the value stored in the item of the number of persons in a queue in the table illustrated in FIG. 4A has become 0 or less is the time when a person corresponding to the number of persons in a queue having become 0 or less has exited the queue.

In the description of the first exemplary embodiment, the queuing time calculation unit 106 sequentially decrements the waiting order of a certain person in a queue each time a person exits the queue, as mentioned above, thus acquiring the time when the certain person exits the queue and calculating the queuing time of the certain person in the queue. However, the queuing time calculation unit 106 can be configured to perform the following processing.

For example, the status storage unit 104 stores information indicating the table illustrated in FIG. 4A or FIG. 4B in a database implemented in the memory 110. The queuing time calculation unit 106 makes the following inquiry to the database using Structured Query Language (SQL). Specifically, the queuing time calculation unit 106 makes an inquiry in such a way as to ask the database to acquire the time of an order corresponding to the number of persons in a queue when a certain person got in the queue from among the times when persons exiting the queue were detected stored after the time when the certain person got in the queue, based on the table illustrated in FIG. 4B. Then, the queuing time calculation unit 106 determines that the time acquired as a result of the inquiry is the time when the certain person got out of the queue.

The queuing time calculation unit 106 can compare a predicted value of the queuing time of an object previously stored in, for example, the memory 110 with the actually measured queuing time of an object and output and store information indicating a result of the comparison to the memory 110. The information indicating a result of the comparison is, for example, information about a difference between the queuing times or information indicating whether the queuing times are the same. Furthermore, the communication unit 107 can output and transmit information indicating a result of the comparison made by the queuing time calculation unit 106 to another apparatus. Moreover, the display unit 108 can output and display information indicating a result of the comparison made by the queuing time calculation unit 106 on the display device 130. With this, the queuing time measurement system can present a result of comparison between the predicted value and the actual measurement result to the user.

As described above, in the first exemplary embodiment, the queuing time measurement system detects each object exiting a queue. Then, the queuing time measurement system detects that, from when a certain object enters the queue, a number of objects corresponding to the number of objects present in the queue when the certain objects enter the queue exit the queue. Then, the queuing time measurement system determines that the detected time is the time when the certain object got out of the queue and measures a queuing time of the certain object based on the time when the certain object got out of the queue and the time when the certain object got in the queue.

In this way, the queuing time measurement system determines whether a certain object has exited a queue based on the number of objects present in the queue when the certain object starts standing in the queue and the number of objects which have exited the queue. With the above processing, without performing processing, such as image recognition or tracking, on a certain object which has entered a queue, the queuing time measurement system can determine whether the certain object has exited the queue. With this, the queuing time measurement system can measure a queuing time without causing an object which has entered a queue to perform an input operation on, for example, a reception device. Therefore, the queuing time measurement system can reduce a troublesome operation as compared with a case where, for example, an input operation is performed on, for example, a reception device, and can more readily measure a queuing time of an object in a queue. Furthermore, the queuing time measurement system does not perform processing, such as image recognition or tracking, on a certain object which has entered a queue, and is, therefore, unlikely to lose sight of the object due to, for example, failure of recognition or tracking. Thus, the queuing time measurement system can more stably measure a queuing time in a queue.

Furthermore, since the first passage detection unit 101 and the second passage detection unit 102 respectively detect passage of a person at the entrance and exit of a queue, it is unnecessary to individually acquire information about a person who enters and exits the queue at timing of entry and exit in the queue.

In the first exemplary embodiment, the queuing time measurement system measures a queuing time in a queue for waiting to take a taxi as a queue the service time of which is not constant. However, the queuing time measurement system can also measure a queuing time in, for example, a queue for waiting to enter a restaurant, a queue at the cash register in a shop, or a queue at the counter or security check in an airport as a queue the service time of which is not constant.

In the above-described first exemplary embodiment, the queuing time measurement system detects a human body passing through the entrance and the exit of a queue using the first passage detection unit 101 and the second passage detection unit 102, each of which is an infrared sensor.

In a second exemplary embodiment, a queuing time measurement system detects a human body passing through the entrance and the exit of a queue based on an image of the queue captured by an imaging apparatus 501.

Figure 5:
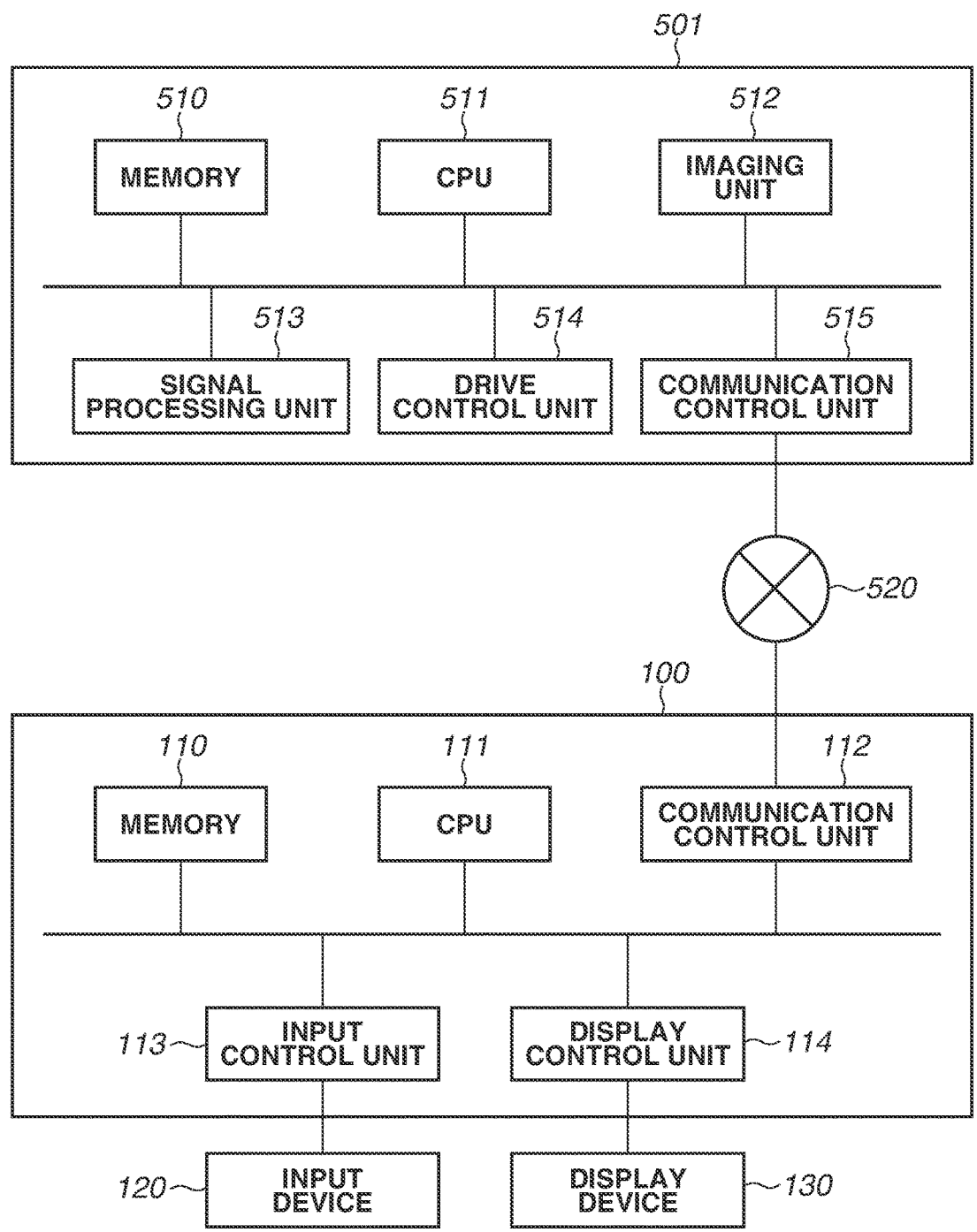
FIG. 5 illustrates an example of a system configuration of a queuing time measurement system and other devices.

FIG. 5 illustrates an example of a system configuration of a queuing time measurement system and another apparatus according to the second exemplary embodiment.

The queuing time measurement system according to the second exemplary embodiment includes an information processing apparatus 100 and an imaging apparatus 501. The information processing apparatus 100 and the imaging apparatus 501 are interconnected via a network 520 in such a way as to be able to communicate with each other. The network 520 is a network used to interconnect the imaging apparatus 501 and the information processing apparatus 100. The network 520 is configured with, for example, a plurality of routers, switches, and cables, which satisfy a communication standard, such as Ethernet. In the second exemplary embodiment, the network 520 does not have restrictions on its communication standard, scale, and configuration as long as it is capable of performing communications between the imaging apparatus 501 and the information processing apparatus 100. For example, the network 520 can be configured with, for example, the Internet, a wired local area network (LAN), a wireless LAN, or a wide area network (WAN).

The imaging apparatus 501 is for example, a network camera. In the second exemplary embodiment, the information processing apparatus 100 performs, for example, driving of the imaging apparatus 501 and acquisition of a captured image from the imaging apparatus 501. An example of a hardware configuration of the queuing time measurement system is described with reference to FIG. 5.

The hardware configuration of the information processing apparatus 100 according to the second exemplary embodiment is similar to that in the first exemplary embodiment.

For example, functions of the information processing apparatus 100 described below with reference to FIG. 6 and processing performed in the flowchart of FIG. 2 are implemented by the CPU 111 executing processing based on a program stored in, for example, the memory 110.

The imaging apparatus 501 includes a memory 510, a CPU 511, an imaging unit 512, a signal processing unit 513, a drive control unit 514, and a communication control unit 515.

The memory 510 is a storage device which stores, for example, various programs, various pieces of setting data, various pieces of image data representing captured images of a queue. The CPU 511 is a processor which controls processing that is performed by the imaging apparatus 501.

The imaging unit 512 includes an image sensor and an optical system which forms a subject image on the image sensor, and performs capturing of an image on the image sensor with an intersection point between the optical axis of the optical system and the image sensor used as an image capturing center. The imaging unit 512 uses an image sensor such as a complementary metal-oxide semiconductor (CMOS) sensor or a charge-coupled device (CCD) sensor.

The signal processing unit 513 performs signal processing on an image signal captured by the imaging unit 512. The signal processing unit 513 performs, for example, coding of an image signal captured by the imaging unit 512. The signal processing unit 513 performs, for example, coding of an image signal captured by the imaging unit 512 using a coding method such as Joint Photographic Experts Group (JPEG).

Furthermore, the signal processing unit 513 can be configured to perform coding of an image signal captured by the imaging unit 512 using a coding method such as H.264/MPEG-4 AVC (hereinafter referred to as "H.264"). Moreover, the signal processing unit 513 can be configured to perform coding of an image signal captured by the imaging unit 512 using a coding method such as High Efficiency Video Coding (HEVC). Additionally, the signal processing unit 513 can be configured to perform coding while selecting a coding method from among a plurality of coding methods.

The drive control unit 514 performs control to change the imaging direction and the angle of view of the imaging unit 512. In the second exemplary embodiment, the imaging unit 512 is able to change the imaging direction in pan directions and tilt directions and to change the imaging angle of view. The imaging apparatus 501 does not need to have a function to change the imaging direction in pan directions and tilt directions, and does not need to have a function to change the angle of view.

The communication control unit 515 is a communication controller used for communications with an external apparatus, such as the information processing apparatus 100, via the network 520. The communication control unit 515 transmits information representing a captured image processed by the signal processing unit 513 to the information processing apparatus 100. Moreover, the communication control unit 515 receives a control instruction issued to the imaging apparatus 501, which is transmitted from the information processing apparatus 100.

For example, the functions of the imaging apparatus 501 and the processing performed by the imaging apparatus 501 are implemented by the CPU 511 executing processing based on a program stored in, for example, the memory 510.

Figure 6:
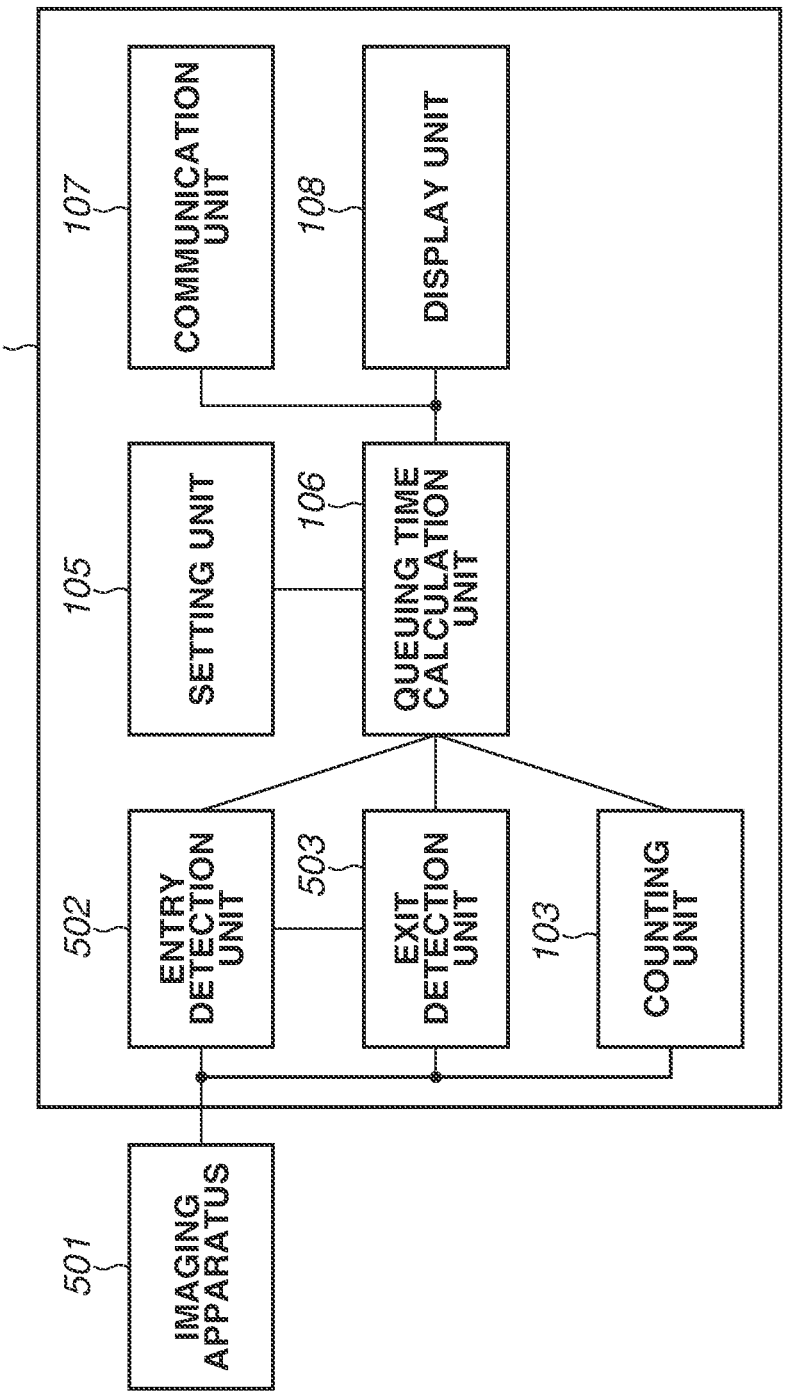
FIG. 6 illustrates an example of a functional configuration of an information processing apparatus and another apparatus.

FIG. 6 illustrates an example of a functional configuration of the information processing apparatus 100 and another apparatus in the second exemplary embodiment. The information processing apparatus 100 according to the second exemplary embodiment includes an entry detection unit 502, an exit detection unit 503, a counting unit 103, a setting unit 105, a queuing time calculation unit 106, a communication unit 107, and a display unit 108. The information processing apparatus 100 in the second exemplary embodiment differs from that in the first exemplary embodiment in that the information processing apparatus 100 includes the entry detection unit 502 and the exit detection unit 503 but does not include the status storage unit 104. The setting unit 105, the queuing time calculation unit 106, the communication unit 107, and the display unit 108 are similar to those in the first exemplary embodiment.

The entry detection unit 502 and the exit detection unit 503 respectively detect entry and exit of objects forming a queue based on an image of the queue captured by the imaging apparatus 501. The imaging apparatus 501 is placed in such a way as to be capable of capturing an image of the entire queue. Each of the entry detection unit 502 and the exit detection unit 503 acquires an image captured by the imaging apparatus 501 as a moving image, and detects passage of an object at a set position based on a temporal change in position of the object detected by image processing and analysis of each frame included in the moving image. Each of the entry detection unit 502 and the exit detection unit 503 is also able to detect passage of an object at each of a plurality of positions in the image.

The counting unit 103 performs image processing or image analysis to detect objects from an image output from the imaging apparatus 501 and counts the number of detected objects. In a case where the imaging apparatus 501 would capture an image of an object present in a region other than a queue, the counting unit 103 can be configured to detect objects only from a previously set region in the image and to count the number of detected objects.

The queuing time calculation unit 106 acquires respective passage times of an object at the entrance and the exit of a queue from the entry detection unit 502 and the exit detection unit 503 at timing indicated by the setting information determined by the setting unit 105, and records information indicating the passage times. Moreover, the queuing time calculation unit 106 acquires the number of objects present in a queue at timing of detection by the entry detection unit 502 from the counting unit 103.

Then, at each time (T1) when passage is detected by the entry detection unit 502, the queuing time calculation unit 106 acquires the time (T2) when a number of objects equal to or greater than the number acquired by the counting unit 103 have been detected by the exit detection unit 503 after the time T1. Then, the queuing time calculation unit 106 calculates "T2−T1" as an actual queuing time of an object which got in the queue at the time T1.

An example of processing performed by the information processing apparatus 100 in the second exemplary embodiment is described with reference to FIG. 2.

The processing in the flowchart of FIG. 2 is started, for example, at the time when the queuing time measurement system is activated.

Processing in step S201 is similar to that in the first exemplary embodiment.

In step S202, the entry detection unit 502 and the exit detection unit 503 respectively detect an object entering a queue and an object exiting the queue based on an image acquired from the imaging apparatus 501.

In step S203, the counting unit 103 counts the number of objects in the queue by analyzing an image captured by the imaging apparatus 501.

In step S204, each time an object is detected by the entry detection unit 502, the queuing time calculation unit 106 stores the time of detection (T1) and the number of persons in the queue acquired by the counting unit 103 when the detected person enters the queue in, for example, the memory 110.

In step S205, the queuing time calculation unit 106 stores the number of objects detected by the exit detection unit 503, and determines whether the number of objects detected after the time stored in step S204 is equal to or greater than the number of objects in the queue acquired in step S204. If it is determined that the number of objects detected after the time stored in step S204 is equal to or greater than the number of objects in the queue acquired in step S204, the queuing time calculation unit 106 determines that the time when a number of objects equal to or greater than the number of objects in the queue acquired in step S204 have been detected is the time T2. Then, the queuing time calculation unit 106 calculates a queuing time of the object in the queue based on the time T1 and the time T2. Processing in steps S206 to S208 is similar to that in the first exemplary embodiment.

In the description of FIG. 2, steps S203, S204, S206, and S207 have been described as a series of processing operations. However, the counting unit 103 and the queuing time calculation unit 106 can be configured to write, for example, results of calculation in steps S203, S204, and S205 in, for example, a database or file stored in the memory 110. Then, the queuing time calculation unit 106, the display unit 108, and the communication unit 107 can perform processing for reading contents of, for example, a database or file stored in the memory 110 as processing different from the processing in steps S203 to S205 and in parallel with the processing in steps S203 to S205.

The queuing time measurement system and an external terminal device can be interconnected via a network, the external terminal device can request the communication unit 107 to transmit, for example, data about the queuing time, and data transmitted from the communication unit 107 in response to the request can be displayed on, for example, a display device of the terminal device.

Furthermore, FIG. 7 illustrates an example of queuing time calculation processing in the second exemplary embodiment. In the second exemplary embodiment, the queuing time calculation unit 106 calculates a queuing time by storing the times when objects are detected by the entry detection unit 502 and the exit detection unit 503 and the number of waiting persons in the database included in the memory 110 and making an inquiry to the database using SQL.

For example, suppose that the number of waiting persons when a person A arrives (T1=one minute and fifteen seconds past eleven) is 8. Since the time (T2) of detection of an object when the number of records of detection time of objects exiting the queue after one minute and fifteen seconds past eleven becomes 9 is six minutes and twenty seconds past eleven, the queuing time of the person A becomes five minutes and fifteen seconds. The queuing time calculation unit 106 performs the above-described processing with respect to a person entering the queue at one minute and twenty-eight seconds past eleven, a person entering the queue at two minutes and nineteen seconds past eleven, . . . , in sequence.

FIGS. 8A, 8B, 8C, 8D, and 8E illustrate an example of the application of the queuing time measurement system.

Figure 8A:
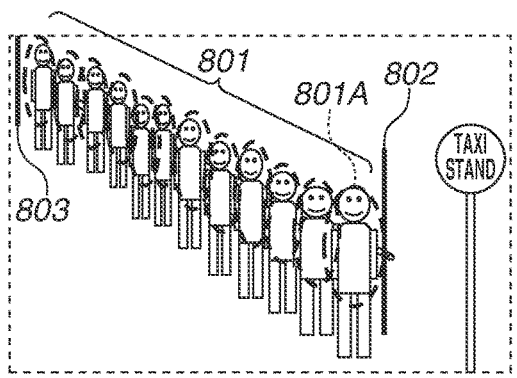
FIGS. 8A, 8B, 8C, 8D, and 8E illustrate an example of the application of the queuing time measurement system.

FIG. 8A illustrates an example of an image of a queue waiting to take a taxi captured by the imaging apparatus 501. The entry detection unit 502, the exit detection unit 503, and the counting unit 103 detect human bodies by detecting upper halves of the human bodies from the image illustrated in FIG. 8A. Each of detected human body frames 801 is a frame indicating the detected upper half of the human body. The display unit 108 is able to generate a detected human body frame 801 based on the center position and size of the detected upper half of the human body and to display the detected human body frame 801 in superimposition on an image captured by the imaging apparatus 501 on, for example, the display device 130.

Each of passage detection line segments 802 and 803 is a line segment indicating a portion where to detect passage. The passage detection line segment 802 is a line segment used to detect an object exiting the queue. Moreover, the passage detection line segment 803 is a line segment used to detect an object entering the queue. The setting unit 105 is able to set the passage detection line segments 802 and 803, for example, in the following way. Specifically, the setting unit 105 instructs the display unit 108 to display, on the display device 130, a passage detection line segment designation screen used to designate the passage detection line segments 802 and 803 and including an image captured by the imaging apparatus 501. Then, the setting unit 105 receives the designation of the passage detection line segments 802 and 803 by the user based on an operation performed by the user on the passage detection line segment designation screen via the input device 120. For example, the user designates the passage detection line segments 802 and 803 by drawing line segments via drag processing using a mouse at positions where to intend to designate passage detection line segments on an image captured by the imaging apparatus 501 included in the passage detection line segment designation screen. The setting unit 105 is able to receive such a designation from the user and to determine the line segments indicated by the received designation as the passage detection line segments 802 and 803.

Figure 8B:
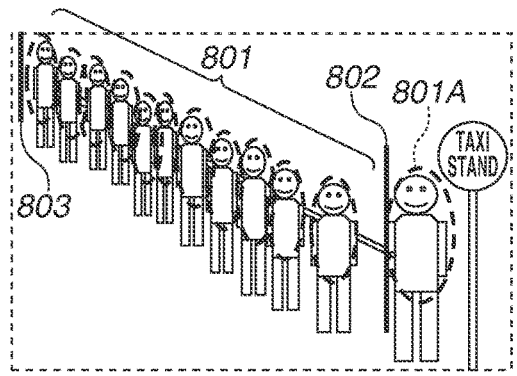

In a case where a person detected as a detected human body frame 801A has moved forward as illustrated in FIG. 8B so as to take a taxi, in step S202, the exit detection unit 503 tracks the person corresponding to the detected human body frame 801A. The exit detection unit 503 recognizes that the person corresponding to the detected human body frame 801A in FIG. 8B has passed the passage detection line segment 802 from the state illustrated in FIG. 8A. In this way, the exit detection unit 503 determines whether a certain person has passed the passage detection line segment 802 based on a change in position of the same person in a plurality of serial image frames in a moving image acquired from the imaging apparatus 501.

Furthermore, in step S203, the counting unit 103 counts the number of human bodies, which serve as objects, present in the image illustrated in FIG. 8B.

Figure 8C:
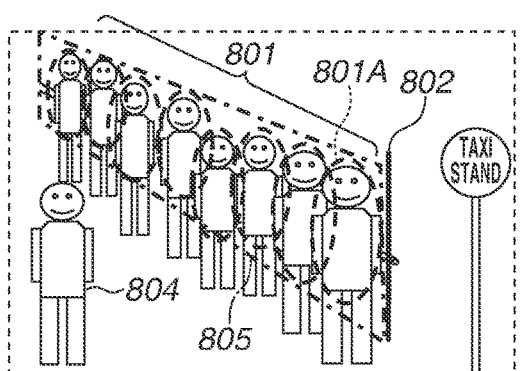

In the case of counting the number of objects present in an image captured by the imaging apparatus 501 in step S203, the counting unit 103 can be configured to detect objects from a set region in the image and to count the number of detected objects. A region 805 illustrated in FIG. 8C is an example of a region targeted for counting objects, which is set to distinguish persons standing in the queue from a passerby 804.

The setting unit 105 is able to determine a region targeted for counting objects, for example, in the following way. Specifically, the setting unit 105 instructs the display unit 108 to display, on the display device 130, a region designation screen used to designate a region targeted for counting objects including an image captured by the imaging apparatus 501. Then, the setting unit 105 receives the designation of the region targeted for counting objects by the user based on an operation performed by the user on the region designation screen via the input device 120. For example, the user designates the region by designating points serving as the corners of the region via click processing using a mouse at positions which to intend to designate as the corners of a region on an image captured by the imaging apparatus 501 included in the region designation screen. The setting unit 105 is able to receive such a designation from the user and to determine a region indicated by the points set by the received designation as the region 805.

Figure 8D:
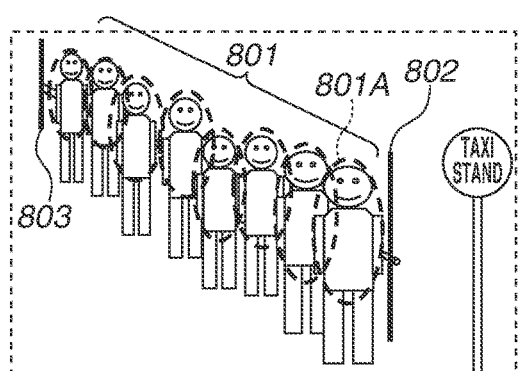

Furthermore, in a case where the passage detection line segments 802 and 803 are set as illustrated in FIG. 8D, the counting unit 103 can be configured to detect objects from a rectangular region defined by the passage detection line segments 802 and 803 and then count the detected objects.

Moreover, the counting unit 103 can count objects using a combination of passage detection line segments and a region targeted for counting which are previously set.

Figure 8E:
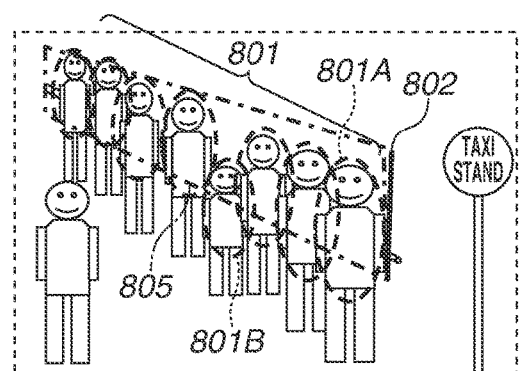

In the second exemplary embodiment, the queue is a queue formed by persons waiting for a taxi. Since it can be assumed that a child does not take a taxi alone but takes a taxi together with an adult, the queuing time measurement system can be configured to deem objects in a queue to be only adults. It can be assumed that a child is shorter in height than an adult. Therefore, in this case, the setting unit 105 sets the positions of the region 805 targeted for counting objects and the passage detection line segment 802 to positions higher than those illustrated in FIG. 8C in such a manner that not all of the upper half of a child is contained in the region 805, as illustrated in FIG. 8E. With this, the entry detection unit 502, the exit detection unit 503, and the counting unit 103 can detect the upper halves of the adult human bodies without detecting the upper half of a child human body. Furthermore, the counting unit 103 detects a human body by detecting the upper half of the human body, and is, therefore, able to detect a human body more accurately than detect the entire human body.

Moreover, it can be assumed that, in a case where the queue is a queue formed by persons standing in line at a children's amusement facility, adults do not use the amusement facility. Therefore, the queuing time measurement system can be configured to deem objects in the queue to be only children. It can be assumed that an adult is taller than a child. Therefore, in this case, the setting unit 105 sets the positions of the region 805 targeted for counting objects and the passage detection line segment 802 to positions lower than those illustrated in FIG. 8C in such a manner that not all of the upper half of an adult is contained in the region 805. With this, the entry detection unit 502, the exit detection unit 503, and the counting unit 103 can detect the upper halves of the child human bodies without detecting the upper half of an adult human body.

Additionally, in the second exemplary embodiment, the imaging apparatus 501 is placed in such a way as to capture an image of the queue from an oblique direction. With this placement, the imaging apparatus 501 can capture an image of human bodies in the queue in such a manner that the human bodies do not overlap each other. With this, the queuing time measurement system can more accurately detect human bodies from the image.

Each of the entry detection unit 502 and the exit detection unit 503 detects passage of an object through the passage detection line segment 803 or 802 by detecting the same object at regions on both sides across the passage detection line segment 803 or 802 in an image. For example, in a case where the passage detection line segment 802 is present in the vicinity of the right-hand edge of an image, a region to the right of the passage detection line segment 802 becomes too narrow to capture the entire image of an object, so that the exit detection unit 503 becomes unable to detect the object.

Therefore, the setting unit 105 can be configured to determine the position of each of the passage detection line segments 803 and 802 in such a manner that the sizes of regions on both sides across the passage detection line segment 803 or 802 are sizes set to such a degree as to enable detecting an object. For example, the setting unit 105 determines the position of each of the passage detection line segments 803 and 802 in such a manner that the sizes of regions on both sides across the passage detection line segment 803 or 802 are larger than the size of an object to be detected. With this, each of the entry detection unit 502 and the exit detection unit 503 can more stably detect an object passing the passage detection line segment 803 or 802, so that the accuracy of queuing time measurement can be improved.

As described above, according to the second exemplary embodiment, the queuing time measurement system counts the number of persons present in a queue based on an image of the queue acquired from the imaging apparatus 501, thus detecting a person entering the queue and a person exiting the queue. In this way, the queuing time measurement system is able to perform queuing time measurement processing based on a captured image of the queue. With this, it becomes unnecessary to individually set an apparatus for detecting passage of a person at a set position, such as an infrared sensor, at a predetermined position for a queue. With this, the queuing time measurement system can be configured in such a way as to simplify the configuration of the queuing time measurement system.

Furthermore, the queuing time measurement system only needs to perform recognition and tracking of an object only in the vicinity of the position where an object enters a queue and the position where an object exits the queue. Therefore, the queuing time measurement system does not need to perform recognition and tracking of an object in the entire region from the position where the object enters a queue to the position where the object exits the queue in an image, and is, therefore, able to more readily measure a queuing time.

In the description of the second exemplary embodiment, a single imaging apparatus 501 captures an image of the entire queue. In a third exemplary embodiment, a region in which a queue is present is broader than in the second exemplary embodiment, and a plurality of imaging apparatuses is configured to capture an image of the queue in a divisional manner. Furthermore, in the description of the first and second exemplary embodiments, the number of exits of a queue is one. In the third exemplary embodiment, a plurality of exits is assumed to be present in a queue.

A system configuration of the queuing time measurement system and a hardware configuration and functional configuration of each system constituent element in the third exemplary embodiment are similar to those in the second exemplary embodiment. In the third exemplary embodiment, the imaging apparatus 501 is configured with a plurality of imaging apparatuses.

FIG. 9 illustrates an example of the application of the queuing time measurement system according to the third exemplary embodiment. An example of a queue at a taxi stand, which serves as a target for queuing time measurement processing, is described with reference to FIG. 9. Points different from those in FIGS. 3A and 3B are described.

Regions 9001 and 9002 are regions where taxis arrive. Taxis arrive at not a single region but two regions. Taxis 901 and 902 arrive inside the ranges of regions 9001 and 9002, respectively.

Furthermore, a region 9003 is a region in which persons waiting for a taxi stand in line. The region 9003 is larger than the region 3002 and includes two riding entrances (exits of a queue) serving as exits 903 and 904 where to take a taxi.

For example, an attendant standing near the exit 904 guides a person 912 waiting for a taxi to select whether to wait at the exit 903 or to directly wait at the exit 904.

In order to capture an image of a queue in a taxi stand such as that illustrated in FIG. 9, a plurality of cameras 907 to 909 is placed. Furthermore, images captured by the cameras 907 and 908 are used to detect objects passing through the riding entrances (exits of the queue), as in the second exemplary embodiment. The cameras 907 to 909 correspond to an imaging apparatus 501 in the third exemplary embodiment.

Figure 10A:
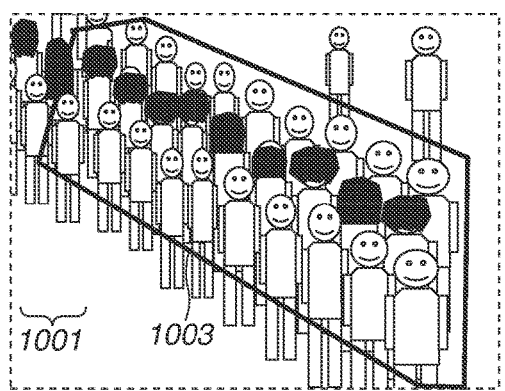
FIGS. 10A and 10B illustrate an example of a region targeted for counting objects.
Figure 10B:
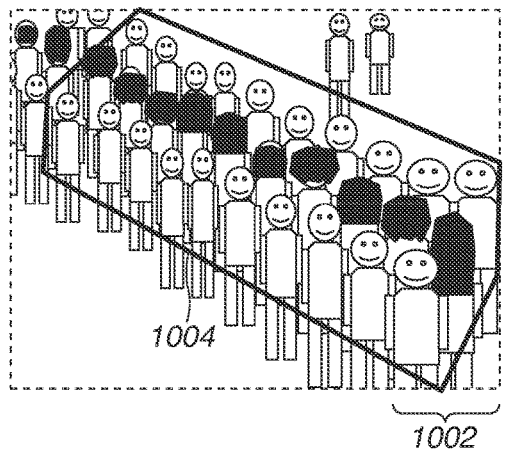

In order for the counting unit 103 to count the number of persons in a queue at the taxi stand without omission based on images captured by the cameras 907 to 909, the cameras 907 to 909 are arranged in the following way. Specifically, the cameras 907 to 909 are arranged in such a manner that their image capturing regions have respective overlaps. An image capturing region 907A illustrated in FIG. 9 is a region indicating an image capturing range provided by the camera 907. An image capturing region 908A illustrated in FIG. 9 is a region indicating an image capturing range provided by the camera 908. An image capturing region 909A illustrated in FIG. 9 is a region indicating an image capturing range provided by the camera 909. FIG. 10A illustrates an example of an image captured by the camera 907. FIG. 10B illustrates an example of an image captured by the camera 908. At this time, since a region 1001 and a region 1002 overlap each other, the setting unit 105 determines regions 1003 and 1004, which serve as targets for detecting objects, in such a way as not to redundantly detect objects. The setting unit 105 determines the regions 1003 and 1004, for example, using a method similar to the method of determining the region 805 illustrated in FIG. 8C in the second exemplary embodiment.

FIG. 11 illustrates an example of a system configuration of the queuing time measurement system and other devices in the third exemplary embodiment. FIG. 11 is a block diagram.

The cameras 907 to 909 capture images of a queue lining up in the taxi waiting region 9003.

Each of the entry detection unit 502 and the exit detection unit 503 detects an object passing a set passage detection line segment based on images captured by the cameras 907 to 909 and then transmits the time when the object has passed the passage detection line segment to the queuing time calculation unit 106. The setting unit 105 determines a line segment designated via a passage detection setting graphical user interface (GUI) 1106 as the passage detection line segment. The passage detection setting GUI 1106 is a GUI used to designate a passage detection line segment. The passage detection line segment designation screen described in the second exemplary embodiment is an example of the passage detection setting GUI 1106. In the third exemplary embodiment, the information processing apparatus 100 is assumed to be a stand-alone information processing apparatus. However, in a case where an increase in number of images captured by the cameras 907 to 909 makes it difficult for a stand-alone information processing apparatus to process all of the captured images within a set period, a plurality of information processing apparatuses can be provided to process the respective images in a distributed manner. In that case, the information processing apparatus 100 is configured with a plurality of information processing apparatuses. Furthermore, the cameras 907 to 909 can be configured to have, for example, a function to count the number of objects in a set region and a function to detect an object passing a set passage detection line segment. In that case, the cameras 907 to 909 transmit, in addition to captured images, information indicating, for example, a result of detection of the number of objects in the set region and an object passing the set passage detection line segment to the information processing apparatus 100.

Furthermore, the setting unit 105 determines a region designated via a number-of-persons count setting GUI 1107 to be a region targeted for counting objects. The number-of-persons count setting GUI 1107 is a GUI used to designate a region targeted for counting objects. The region designation screen described in the second exemplary embodiment is an example of the number-of-persons count setting GUI 1107.

The counting unit 103 counts, at set timing, the number of objects included in a region determined via the number-of-persons count setting GUI 1107 in images captured by the cameras 907 to 909. The queuing time measurement system uses one or a plurality of images captured by the cameras 907 to 909 for processing for counting objects in a queue according to the waiting status of the queue.

The counting unit 103 does not necessarily need to perform processing for counting objects in a queue based on a moving image output from the imaging apparatus 501, but can perform such processing based on a still image acquired from the imaging apparatus 501 at set timing.

The counting unit 103 performing processing for counting objects in a queue after acquiring one still image at set timing can more reduce the load on a resource of, for example, the CPU 111 than performing processing for counting objects in a queue while constantly acquiring a moving image. Moreover, the number of cameras capable of performing processing for counting the number of persons with a single information processing apparatus increases advantageously.

Figure 12:
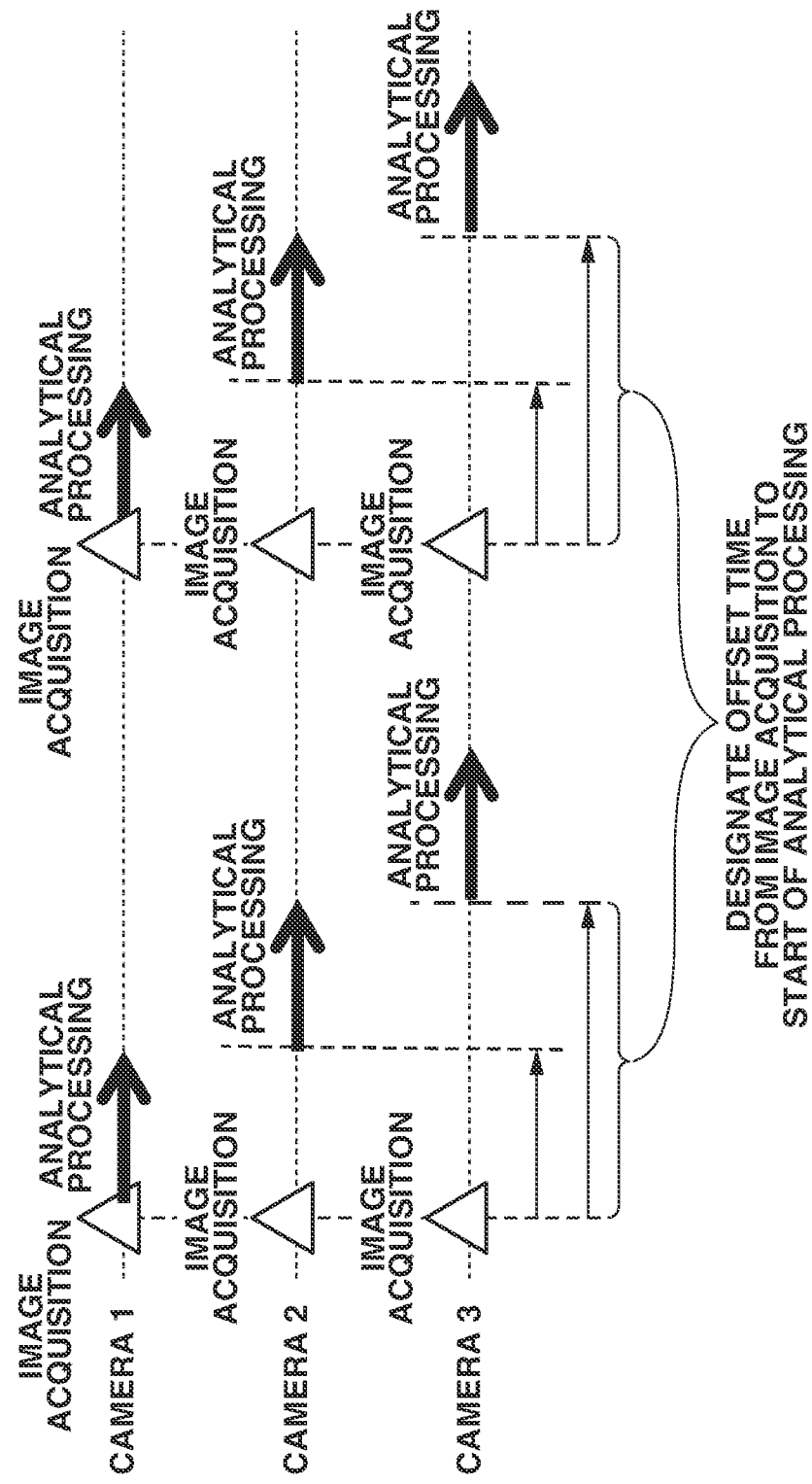
FIG. 12 illustrates an example of timing of processing performed by the queuing time measurement system.

In that case, as illustrated in FIG. 12, the queuing time measurement system can acquire images captured at the same time from the cameras and start analytical processing, such as processing for counting objects in a queue and processing for detecting passage of an object at the passage detection line segment, in sequence with respect to the respective acquired images. According to this processing, since processing is performed on the images captured at the same time by a plurality of cameras, when persons in a queue move, the same person can be prevented from being photographed by different cameras and being redundantly counted. Moreover, the processing load on the CPU 111 can be reduced.

Furthermore, in a case where the counting unit 103 counts the number of objects in a queue based on still images captured at regular intervals, the counting unit 103 would count only the number of objects in a queue at the times when still images have been captured. In this case, the counting unit 103 can count the number of objects in a queue at the time other than the timing of capturing of still images in the following way.

Specifically, the counting unit 103 acquires, based on an image captured at a set time, the number of objects in a queue at that time. Then, until a next still image is acquired from the camera after that time, the counting unit 103 adds "1" to the acquired number of objects each time an object passing through the entrance of the queue is detected by the entry detection unit 502. Moreover, until a next still image is acquired from the camera after that time, the counting unit 103 subtracts "1" from the acquired number of objects each time an object passing through the exit of the queue is detected by the exit detection unit 503. With this processing, the counting unit 103 corrects the number of objects in a queue each time passage of an object at the entrance or exit of the queue is detected, and thus can reduce the load on the CPU 111 and further can correctly count the number of objects in the queue.

In the third exemplary embodiment, a plurality of entrances, such as the entrance 903 and the entrance 904, is present in a queue. Therefore, when an object enters a queue, the object in the queue does not necessarily get out of the queue after all of the objects already present in the queue get out of the queue. For example, in a case where an object is present in the region 913 when a certain object exits the queue through the exit 904, the waiting order of the certain object, which is decremented each time an object exits the queue, does not become "0". Therefore, in the case of the queuing time measurement systems in the first and second exemplary embodiments, since the waiting order of the certain object does not become "0", the fact that the certain object has exited the queue cannot be recognized.

Accordingly, in the third exemplary embodiment, the queuing time measurement system performs, for example, the following processing. The queuing time measurement system deems a queue formed by objects present in a region other than the region 913 in the region 9003 as a first queue, and deems a queue formed by objects present in the region 913 as a second queue. The queuing time measurement system deems the exit 904 and the entrance of the region 913 as an exit of the first queue. Each of the first queue and the second queue is an example of a partial queue, which is a partial queue of the entire queue.

When an object passing through the entrance 906 and entering the first queue is detected by the entry detection unit 502, the counting unit 103 counts the number of objects present in the first queue when the object enters the first queue. Then, the counting unit 103 determines the counted value as a waiting order of the object. Then, the queuing time calculation unit 106 performs the following processing each time an object passing through the exit 904 and exiting the first queue or an object entering the region 913 and exiting the first queue is detected by the exit detection unit 503. Specifically, the queuing time calculation unit 106 decreases the waiting order of the object entering the first queue by the number of detected objects.

If, when the waiting order of the object entering the first queue has become 0 or less, an object passing through the exit 904 is detected by the exit detection unit 503, the queuing time calculation unit 106 performs the following processing. Specifically, the queuing time calculation unit 106 determines the time of detection as the time when the object entering the first queue has exited the entire queue. Then, the queuing time calculation unit 106 measures a queuing time of the object based on the time when the object has exited the entire queue and the time when the object entering the first queue was detected by the entry detection unit 502.

Moreover, if, when the waiting order of the object has become 0 or less, an object exiting the first queue is detected by the exit detection unit 503 and an object entering the second queue is detected by the entry detection unit 502, the queuing time calculation unit 106 performs the following processing. Specifically, the queuing time calculation unit 106 determines the time of detection as the time when the object entering the first queue has exited the first queue. Then, the queuing time calculation unit 106 measures a queuing time of the object in the first queue based on the time when the object has exited the first queue and the time when the object entering the first queue was detected by the entry detection unit 502. Then, the queuing time measurement system similarly calculates a queuing time in the second queue with respect to the object entering the second queue.

Then, the queuing time calculation unit 106 adds together the calculated queuing time in the first queue and the calculated queuing time in the second queue, and calculates a result of the addition as a queuing time of the object in the entire queue.

The queuing time calculation unit 106 stores information indicating the calculated queuing time in, for example, a database (DB) 1109 or a comma separated value (CSV) file stored in the memory 110. Furthermore, the communication unit 107 can transmit information indicating the queuing time calculated by the queuing time calculation unit 106 to an external terminal device. Moreover, the display unit 108 can display the information on, for example, an external monitor 1110. The monitor 1110 is a display such as a digital signage device, and is an example of the display device 130. The queuing time calculation unit 106 can store, in a database stored in the memory 110, not only information indicting the calculated queuing time but also information indicating, for example, the time when an object passed the passage detection line segment and the number of objects in a queue. Then, the display unit 108 can display, on, for example, the monitor 1110, the information indicating, for example, the time when an object passed the passage detection line segment and the number of objects in a queue stored in the database 1109 stored in the memory 110. Furthermore, the information processing apparatus 100 can acquire, from an external terminal device, information indicating a time period in which objects information about which is to be tallied passed the passage detection line segment.

The queuing time measurement system can be configured to calculate a queuing time with respect to an object entering a queue within a previously-set period and to display the calculated queuing time on the display device 130. Furthermore, the queuing time measurement system can be configured to calculate a queuing time with respect to an object entering a queue each time an object passing through the entrance of the queue is detected by the entry detection unit 502 and to display the calculated queuing time on the display device 130. More specifically, each time an object passing through the entrance of a queue is detected by the entry detection unit 502, the counting unit 103 counts the number of persons in the queue. Then, the queuing time calculation unit 106 calculates a queuing time based on the time when the object got in the queue and the time when a number of objects corresponding to the number calculated by the counting unit 103 have been detected by the exit detection unit 503.

Figure 13B:
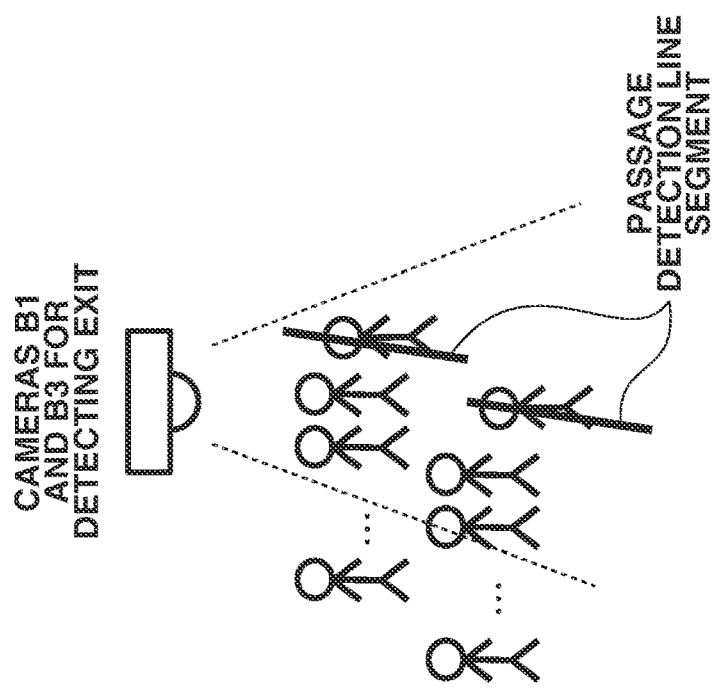
FIGS. 13A and 13B illustrate an example of processing performed by the queuing time measurement system.
Figure 13A:
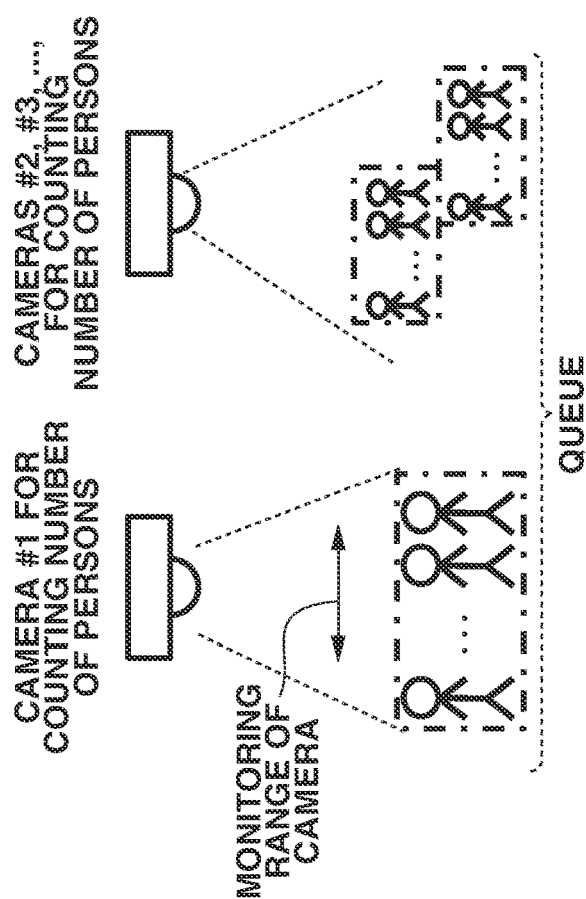

While, in the third exemplary embodiment, the setting unit 105 sets only one region targeted for counting persons with respect to an image captured by one camera, the setting unit 105 can set two or more regions as illustrated in FIG. 13A.

Furthermore, the setting unit 105 sets one passage detection line segment in an image. However, as illustrated in FIG. 13B, in a case where one camera is placed in such a way as to be able to capture an image of a plurality of reading entrances, the setting unit 105 can set a plurality of passage detection line segments in an image captured by the camera. In that case, the entry detection unit 502 and the exit detection unit 503 detect passage of objects at the respective passage detection line segments.

Furthermore, in a case where the counting unit 103 counts the number of objects in the region 913 illustrated in FIG. 9, when the counted number of objects in the region 913 has become equal to or less than a set threshold value, the display unit 108 can display the following information on a display monitor 911. Specifically, the display unit 108 can display, on the display monitor 911, information prompting a person 912 waiting in front of the region 913 in the queue to move to the forward riding entrance.

As described above, according to the processing in the third exemplary embodiment, even in a case where a plurality of cameras is used to divisionally capture an image of a queue or a case where a plurality of exits is present in a queue, the queuing time measurement system can more readily and more stably measure a queuing time.

Furthermore, the queuing time measurement system can calculate an average of queuing times of objects exiting a queue in each predetermined period, or can determine a queuing time of a certain object as a representative value in the time period. In that case, if no object exits the queue in the time period, the queuing time measurement system can determine a simple average or weighted average of values of queuing times of objects exiting the queue in preceding and subsequent time periods as a representative value in the time period. Moreover, if no object exits the queue in the time period, the queuing time measurement system can determine any one of values of queuing times of objects exiting the queue in preceding and subsequent time periods as a representative value in the time period.

In the description of the first to third exemplary embodiments, a queue is formed in a previously set region. In a fourth exemplary embodiment, a case where a queue is formed beyond a set region due to an increase in number of objects in the queue is described.

A system configuration of the queuing time measurement system and a hardware configuration and functional configuration of each system constituent element in the fourth exemplary embodiment are similar to those in the third exemplary embodiment.

Figure 14A:
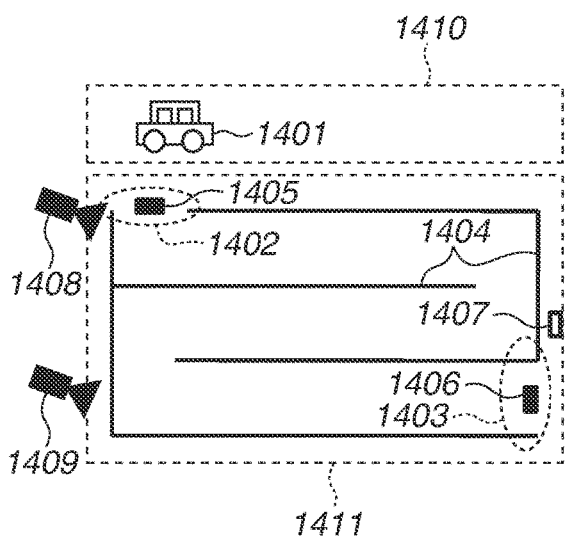
FIGS. 14A, 14B, and 14C illustrate an example of the application of a queuing time measurement system.
Figure 14B:
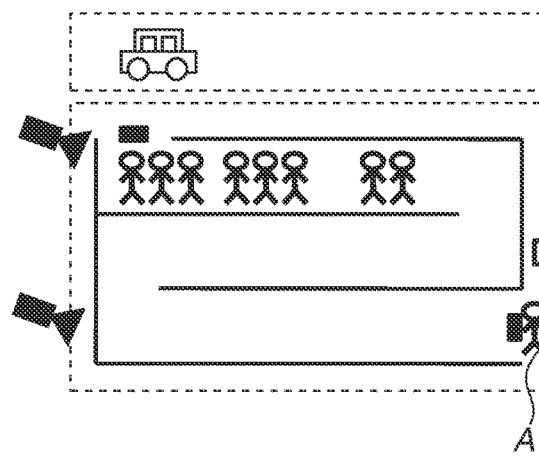
Figure 14C:
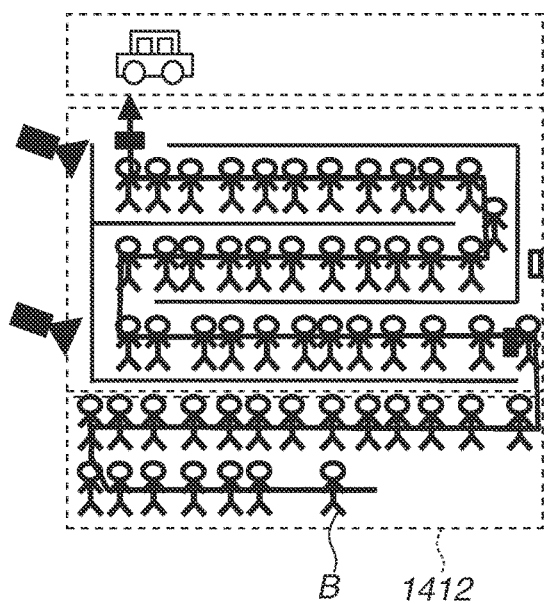

FIGS. 14A, 14B, and 14C illustrate an example of the application of the queuing time measurement system.

FIG. 14A illustrates an example of a behavior in which a taxi 1401 arrives at a taxi stand within a region 1410, in which taxis arrive.

A region 1411 is a region in which persons waiting to take a taxi line up. Cameras 1408 and 1409 are placed in the region 1411.

The example illustrated in FIG. 14A indicates a state in which any queue is not yet formed, so that no person is present in the region 1411.

FIG. 14B illustrates an example of a state in which a person A who wants to take a taxi is going to pass through an entrance 1403 to enter the region 1411.

The queuing time measurement system measures a queuing time of the person A by performing processing similar to that in the first to third exemplary embodiments. For example, the counting unit 103 counts the number of persons present in a queue when the person A has entered the queue based on a still image captured by the camera 1408, and stores information indicating a set of the counted number of persons and the time when the person A has been detected by the entry detection unit 502 in, for example, the memory 110.

The queuing time calculation unit 106 determines the time when the number of persons detected by the exit detection unit 503 after the time of detection becomes equal to or greater the stored number of persons as the time when the person A has exited the queue. The queuing time calculation unit 106 calculates the actual queuing time of the person A in the region 1411 by calculating a difference between the time when the person A has taken a taxi and the time when the person A entering the queue was detected. The queuing time measurement system also performs the above-described processing with respect to objects other than the person A, thus being able to measure a queuing time of each object in the queue.

FIG. 14C is a diagram illustrating an example of a state in which the queue has extended beyond the region 1411. FIG. 14C illustrates a behavior in which the queue has extended to a region 1412 adjacent to the region 1411. At this time, a method of calculating a queuing time by the queuing time measurement system in a case where a person B enters the queue is described as follows.

The queuing time measurement system deems a queue formed by objects present in the region 1412 to be a first queue, and deems a queue formed by objects present in the region 1411 to be a second queue. Each of the first queue and the second queue in the fourth exemplary embodiment is an example of a partial queue.

The entry detection unit 502 detects an object entering the first queue based on an image of the region 1412 captured by the camera 1409. For example, the entry detection unit 502 detects a new object entering the region 1412 as the object entering the first queue. The entry detection unit 502 can count the number of objects in the first queue, for example, in a case where the number of objects remaining still has increased according to movement of objects in the region 1412 or a case where an object moving has stopped next to an object remaining still. With the above processing, the entry detection unit 502 is able to detect an object entering a queue the entrance of which is not predetermined.

The exit detection unit 503 detects an object which has moved from the region 1412 to the region 1411 as an object exiting the first queue and entering the second queue, based on an image of the region 1412 captured by the camera 1409.

The counting unit 103 counts the number of objects present in the first queue when a new object enters the first queue based on an image of the region 1412 captured by the camera 1409. The counting unit 103 can count the number of objects present in the first queue when a new object enters the first queue or can count the number of objects present in the first queue periodically at set intervals. The counting unit 103 can count the number of objects in the first queue, for example, in a case where the number of objects remaining still has increased according to movement of objects in the region 1412 or a case where an object moving has stopped next to an object remaining still.

When the person B enters the first queue, the queuing time measurement system measures a queuing time of the person B in the first queue by performing processing similar to that in the first to third exemplary embodiments. Then, when the person B enters the region 1411 from the region 1412 to get in the second queue, the queuing time measurement system measures a queuing time of the person B in the second queue by performing processing similar to that in the first to third exemplary embodiments. Then, the queuing time measurement system adds together the measured queuing time of the person B in the first queue and the measured queuing time of the person B in the second queue, thus measuring a queuing time of the person B in the entire queue.

The queuing time measurement system differentiates between a region the entrance of which is predetermined and a region the entrance of which is not predetermined and calculates a queuing time in the queue of each of the regions, and is, therefore, able to calculate a more accurate actual queuing time.

The queuing time measurement system can count objects in a region set in an image. Additionally, in a case where an image of a queue is captured by a plurality of cameras, the queuing time measurement system can be configured to sum results of counting of objects in the respective images.

The communication unit 107 or the display unit 108 is able to display, on the display device 130, or transmit, to an external device, information obtained by appropriately tallying and graphing measured queuing times in queues as analytical information about queues. The analytical information about queues is information useful to, for example, determine positioning or location of attendants.

As described above, according to the fourth exemplary embodiment, the queuing time measurement system can measure a queuing time of an object even in a case where a queue is formed beyond a region set as a region in which a queue is to be formed.

The present disclosure is not limited to the first to fourth exemplary embodiments, and can be modified or varied in various manners within the range of the scope thereof.

One or more functions of the above-described exemplary embodiments can be implemented by supplying a program to a system or apparatus via a network or a storage medium and causing one or more processors in a computer of the system or apparatus to read out and execute the program. The above-described functions can also be implemented by a circuit that implements one or more of the functions, e.g., an application specific integrated circuit (ASIC).

While various exemplary embodiments have been described above, these specific exemplary embodiments are not seen to be limiting.

For example, a part or the whole of the functional configuration of the above-described queuing time measurement system can be implemented as hardware in the information processing apparatus 100.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168355 filed Aug. 30, 2016, which is hereby incorporated by reference herein in its entirety.

What is claimed is:

1. An information processing apparatus comprising:
    a first detection unit configured to detect an object entering a queue;
    a second detection unit configured to detect an object exiting the queue;
    an acquisition unit configured to acquire a number of objects lining up in a queue which includes a target object targeted for measuring a queuing time, in a case where the first detection unit has detected that the target object has entered the queue;
    a measurement unit configured to measure, as the queuing time of the target object in the queue, a period from a time when the target object has entered the queue to a time when a number of objects having been detected by the second detection unit has reached the number acquired by the acquisition unit; and
    an output unit configured to output the queuing time of the target object in the queue measured by the measurement unit.

2. The information processing apparatus according to claim 1,
    wherein the first detection unit detects an object passing through an entrance of the queue based on a plurality of images of the queue captured at set intervals, and
    wherein the second detection unit detects an object passing through an exit of the queue based on a plurality of images of the queue captured at set intervals.

3. The information processing apparatus according to claim 2, wherein the first detection unit detects an object passing through the entrance of the queue based on a position of an object in each of the plurality of images of the queue captured at set intervals, and wherein the second detection unit detects an object passing through the exit of the queue based on a position of an object in each of the plurality of images of the queue captured at set intervals.

4. The information processing apparatus according to claim 3, wherein the first detection unit detects an object passing through the entrance of the queue based on a line segment indicating the entrance of the queue and the position of an object in each of the plurality of images of the queue captured at set intervals, and wherein the second detection unit detects an object passing through the exit of the queue based on a line segment indicating the exit of the queue and the position of an object in each of a plurality of images of the queue captured at set intervals.

5. The information processing apparatus according to claim 4, wherein the line segment indicating the exit of the queue in each of the plurality of images of the queue captured at set intervals is a line segment set in such a manner that a size of each of regions on both sides across the line segment in each image is greater than or equal to a set size, and wherein the line segment indicating the entrance of the queue in each of the plurality of images of the queue captured at set intervals is a line segment set in such a manner that a size of each of regions on both sides across the line segment in each image is greater than or equal to a set size.

6. The information processing apparatus according to claim 4, further comprising a reception unit configured to receive a designation of the line segment indicating the entrance or the exit of the queue via a line segment designation screen including a captured image of the queue and used to designate the line segment indicating the entrance or the exit of the queue, wherein the first detection unit detects an object passing through the entrance of the queue based on the line segment indicating the entrance of the queue indicated by the designation received by the reception unit and the position of an object in each of a plurality of images of the queue captured at set intervals, and wherein the second detection unit detects an object passing through the exit of the queue based on the line segment indicating the exit of the queue indicated by the designation received by the reception unit and the position of an object in each of a plurality of images of the queue captured at set intervals.

7. The information processing apparatus according to claim 2, wherein the second detection unit detects an object passing through the exit of the queue based on a plurality of line segments indicating a plurality of exits of the queue and a position of an object in each of a plurality of images of the queue captured at set intervals.

8. The information processing apparatus according to claim 1, wherein, in a case where the target object enters the queue including a plurality of partial queues serving as a plurality of queues, with respect to each of the plurality of partial queues, the acquisition unit acquires a number of objects lining up in a partial queue which includes the target object, in a case where the first detection unit has detected that the target object has entered the partial queue, wherein, with respect to each of the plurality of partial queues, the second detection unit detects an object exiting the partial queue, and wherein the measurement unit measures a queuing time of the object in the queue by acquiring, with respect to each of the plurality of partial queues, a period from a time when the target object has entered the partial queue to a time when a number of objects having been detected by the second detection unit has reached the number acquired by the acquisition unit with respect to the partial queue and summing the acquired periods.

9. The information processing apparatus according to claim 1, wherein the acquisition unit acquires the number of objects lining up in the queue based on a number of objects that have entered the queue and a number of objects that have exited the queue.

10. The information processing apparatus according to claim 1, wherein the acquisition unit acquires the number of objects lining up in the queue by detecting an object from a captured image of the queue and counting a number of detected objects.

11. The information processing apparatus according to claim 10, wherein the acquisition unit acquires the number of objects lining up in the queue by detecting an object from a region targeted for counting objects set in a captured image of the queue and counting a number of detected objects.

12. The information processing apparatus according to claim 11, further comprising a reception unit configured to receive a designation of the region targeted for counting objects via a region designation screen including a captured image of the queue and used to designate the region targeted for counting objects, wherein the acquisition unit acquires the number of objects lining up in the queue by detecting an object from the region targeted for counting objects in a captured image of the queue indicated by the designation received by the reception unit and counting a number of detected objects.

13. The information processing apparatus according to claim 10, wherein, by detecting an object from an image of the queue captured at a set time and counting a number of detected objects, the acquisition unit acquires a number of objects lining up in the queue at the set time, and acquires a number of objects lining up in the queue at time after the set time based on the number of objects lining up in the queue at the set time, a number of objects that have entered the queue after the set time, and a number of objects that have exited the queue after the set time.

14. The information processing apparatus according to claim 10, wherein the acquisition unit acquires the number of objects lining up in the queue by detecting an object from each of a plurality of images of the queue separately captured at an identical time, counting objects detected in each of the plurality of images, and summing together a result of counting the objects.

15. The information processing apparatus according to claim 10, wherein the acquisition unit acquires the number of objects lining up in the queue by detecting a set portion of an object from a captured image of the queue to detect an object and counting a number of detected objects.

16. The information processing apparatus according to claim 1, further comprising a comparison unit configured to compare the queuing time of the target object in the queue measured by the measurement unit with a predicted value of a set queuing time, wherein the output unit outputs a comparison result.

17. An information processing method, the information processing method comprising:

a first detection step for detecting an object entering a queue;

a second detection step for detecting an object exiting the queue;

an acquiring step for acquiring a number of objects lining up in a queue which includes a target object targeted for measuring a queuing time, in a case where the target object entering the queue has been detected in the first detection step;

a measuring step for measuring, as the queuing time of the target object in the queue, a period from a time when the target object has entered the queue to a time when a number of objects having been detected in the second detection step has reached the number acquired in the acquiring step; and an output step for outputting the queuing time of the target object in the queue measured in the measurement step.

18. A non-transitory computer-readable storage medium storing computer-executable instructions that when executed by a computer cause the computer to perform a method, the method comprising:

a first detection step for detecting an object entering a queue;

a second detection step for detecting an object exiting the queue;

an acquiring step for acquiring a number of objects lining up in a queue which includes a target object targeted for measuring a queuing time, in a case where the target object entering the queue has been detected in the first detection step;

a measuring step for measuring, as the queuing time of the target object in the queue, a period from a time when the target object has entered the queue to a time when a number of objects having been detected in the second detection step has reached the number acquired in the acquiring step; and an output step for outputting the queuing time of the target object in the queue measured in the measurement step.

\* \* \* \* \*